US011102020B2

(12) United States Patent
Sakamoto

(10) Patent No.: US 11,102,020 B2
(45) Date of Patent: Aug. 24, 2021

(54) INFORMATION PROCESSING DEVICE, INFORMATION PROCESSING SYSTEM, AND INFORMATION PROCESSING METHOD

(71) Applicant: SHARP KABUSHIKI KAISHA, Sakai (JP)

(72) Inventor: Kiho Sakamoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 121 days.

(21) Appl. No.: 16/232,901

(22) Filed: Dec. 26, 2018

(65) Prior Publication Data

US 2019/0199543 A1 Jun. 27, 2019

(30) Foreign Application Priority Data

Dec. 27, 2017 (JP) .............................. JP2017-252122

(51) Int. Cl.
| | | |
|---|---|---|
| G06F 15/16 | (2006.01) | |
| H04L 12/18 | (2006.01) | |
| G06F 3/0488 | (2013.01) | |
| G06Q 10/02 | (2012.01) | |
| G06Q 10/10 | (2012.01) | |
| H04L 29/08 | (2006.01) | |

(52) U.S. Cl.
CPC ...... *H04L 12/1822* (2013.01); *G06F 3/04883* (2013.01); *G06Q 10/02* (2013.01); *G06Q 10/10* (2013.01); *H04L 12/1818* (2013.01); *H04L 67/06* (2013.01)

(58) Field of Classification Search
CPC . H04L 12/1822; H04L 12/1818; H04L 67/06; G06F 3/04883; G06Q 10/10

USPC .................................................. 709/203, 204
See application file for complete search history.

(56) References Cited

U.S. PATENT DOCUMENTS

| | | | | |
|---|---|---|---|---|
| 6,256,620 | B1* | 7/2001 | Jawahar | G06F 11/3495 |
| 6,298,356 | B1* | 10/2001 | Jawahar | G06F 11/3495 |
| 6,542,936 | B1* | 4/2003 | Mayle | G06Q 10/107 |
| | | | | 709/250 |
| 7,006,881 | B1* | 2/2006 | Hoffberg | G05B 15/02 |
| | | | | 700/17 |
| 7,007,235 | B1* | 2/2006 | Hussein | H04L 12/1822 |
| | | | | 715/751 |
| 7,047,177 | B1* | 5/2006 | Lee | H04L 41/0823 |
| | | | | 703/22 |
| 7,089,317 | B2* | 8/2006 | Jeyaraman | G06F 9/546 |
| | | | | 709/203 |
| 7,143,087 | B2* | 11/2006 | Fairweather | G06F 8/427 |
| | | | | 707/770 |
| 7,627,658 | B2* | 12/2009 | Levett | G06F 9/46 |
| | | | | 709/203 |

(Continued)

FOREIGN PATENT DOCUMENTS

JP 2011-223339 A 11/2011

*Primary Examiner* — Thu Ha T Nguyen
(74) *Attorney, Agent, or Firm* — ScienBiziP, P.C.

(57) ABSTRACT

Provided is an information processing device connectible to a file server and a display control device capable of executing a selected application. The information processing device includes a controller that determines whether a predetermined file is acquirable from the file server, in which the controller selects a first application if the file is acquirable, and selects a second application different from the first application if the file is not acquirable.

7 Claims, 22 Drawing Sheets

(56) References Cited

U.S. PATENT DOCUMENTS

| | | | |
|---|---|---|---|
| 7,870,153 B2* | 1/2011 | Croft | G06F 9/45533 707/781 |
| 8,054,494 B2* | 11/2011 | Takahashi | G06F 3/1285 358/1.15 |
| 9,245,241 B2* | 1/2016 | Kite | G06Q 10/06 |
| 2002/0103864 A1* | 8/2002 | Rodman | H04L 61/20 709/204 |
| 2003/0021400 A1* | 1/2003 | Grandgent | H04M 3/42153 379/202.01 |
| 2003/0078960 A1* | 4/2003 | Murren | H04L 67/34 709/203 |
| 2003/0105811 A1* | 6/2003 | Laborde | G06F 16/256 709/203 |
| 2004/0186743 A1* | 9/2004 | Cordero, Jr. | G06Q 10/1053 705/321 |
| 2004/0199580 A1* | 10/2004 | Zhakov | H04M 3/565 709/204 |
| 2004/0236710 A1* | 11/2004 | Clary | G06F 40/174 706/46 |
| 2005/0192822 A1* | 9/2005 | Hartenstein | G06Q 50/01 705/319 |
| 2006/0010392 A1* | 1/2006 | Noel | H04N 7/15 715/759 |
| 2006/0200253 A1* | 9/2006 | Hoffberg | G05B 15/02 700/19 |
| 2006/0200517 A1* | 9/2006 | Nelson | H04L 65/4023 709/204 |
| 2006/0229896 A1* | 10/2006 | Rosen | G06Q 10/1053 705/321 |
| 2007/0005795 A1* | 1/2007 | Gonzalez | H04N 19/186 709/232 |
| 2007/0026371 A1* | 2/2007 | Wood | G09B 5/062 434/317 |
| 2007/0050448 A1* | 3/2007 | Gonen | H04N 7/152 709/204 |
| 2007/0185957 A1* | 8/2007 | Mandalia | H04L 65/4007 709/204 |
| 2007/0280464 A1* | 12/2007 | Hughes | H04Q 3/0016 379/205.01 |
| 2007/0288563 A1* | 12/2007 | Karkanias | G06F 16/954 709/204 |
| 2008/0010130 A1* | 1/2008 | Pyhalammi | G06Q 30/0601 705/14.26 |
| 2008/0320081 A1* | 12/2008 | Shriver-Blake | G06Q 10/10 709/205 |
| 2009/0006129 A1* | 1/2009 | Thukral | G16H 20/10 705/2 |
| 2009/0292999 A1* | 11/2009 | LaBine | H04L 12/1827 715/740 |
| 2009/0300525 A1* | 12/2009 | Jolliff | H04M 1/72451 715/764 |
| 2011/0055893 A1* | 3/2011 | Walls | H04L 67/141 726/3 |
| 2011/0087973 A1* | 4/2011 | Martin | G06Q 10/06 715/753 |
| 2011/0099227 A1* | 4/2011 | Walls | H04L 12/1822 709/204 |
| 2011/0167110 A1* | 7/2011 | Hoffberg | G06F 3/048 709/203 |
| 2011/0252092 A1* | 10/2011 | Amemura | H04L 12/1818 709/204 |
| 2013/0132862 A1* | 5/2013 | Noel | G06F 3/0481 715/753 |
| 2013/0198743 A1* | 8/2013 | Kruglick | G06F 9/45558 718/1 |
| 2013/0288692 A1* | 10/2013 | Dupray | H04W 76/50 455/450 |
| 2016/0021255 A1* | 1/2016 | Weldon | H04M 3/42272 455/411 |
| 2016/0085884 A1* | 3/2016 | Schafer | G06F 30/13 703/1 |
| 2016/0358312 A1* | 12/2016 | Kolb, V | G06T 3/40 |
| 2018/0013893 A1* | 1/2018 | Cohen | H04L 12/1818 |
| 2019/0190908 A1* | 6/2019 | Shen | H04L 63/10 |

* cited by examiner

FIG. 4

| CONDITION | SELECTED APPLICATION |
|---|---|
| FILE EXISTS | FILE DISPLAY APPLICATION |
| NO FILE EXISTS | HANDWRITING/ DRAWING APPLICATION |
| ⋮ | ⋮ |

FIG. 5

| USER NAME | PASSWORD |
|---|---|
| SUZUKI | SUZUKI1234 |
| TAKAHASHI | TAKAHASHI1234 |
| ⋮ | ⋮ |

FIG. 6

| USER NAME | PASSWORD |
|---|---|
| SUZUKI | aaa123 |
| TAKAHASHI | takahashi123 |
| ⋮ | ⋮ |

FIG. 7

| CONFERENCE ID | CONFERENCE NAME | TIME | ATTENDEE USER NAMES | FILE STORAGE DESTINATION |
|---|---|---|---|---|
| KaigiA | 2019 MODEL INFORMATION SHARING | 10/14/2017 15:00 TO 16:00 | SUZUKI, TAKAHASHI, TANAKA | FileServerA/KaigiA/171013 |
| KaigiB | SOLUTION MTG. | 10/15/2017 10:00 TO 11:00 | SUZUKI, YAMADA, SATOU | - |
| ... | ... | ... | ... | ... |

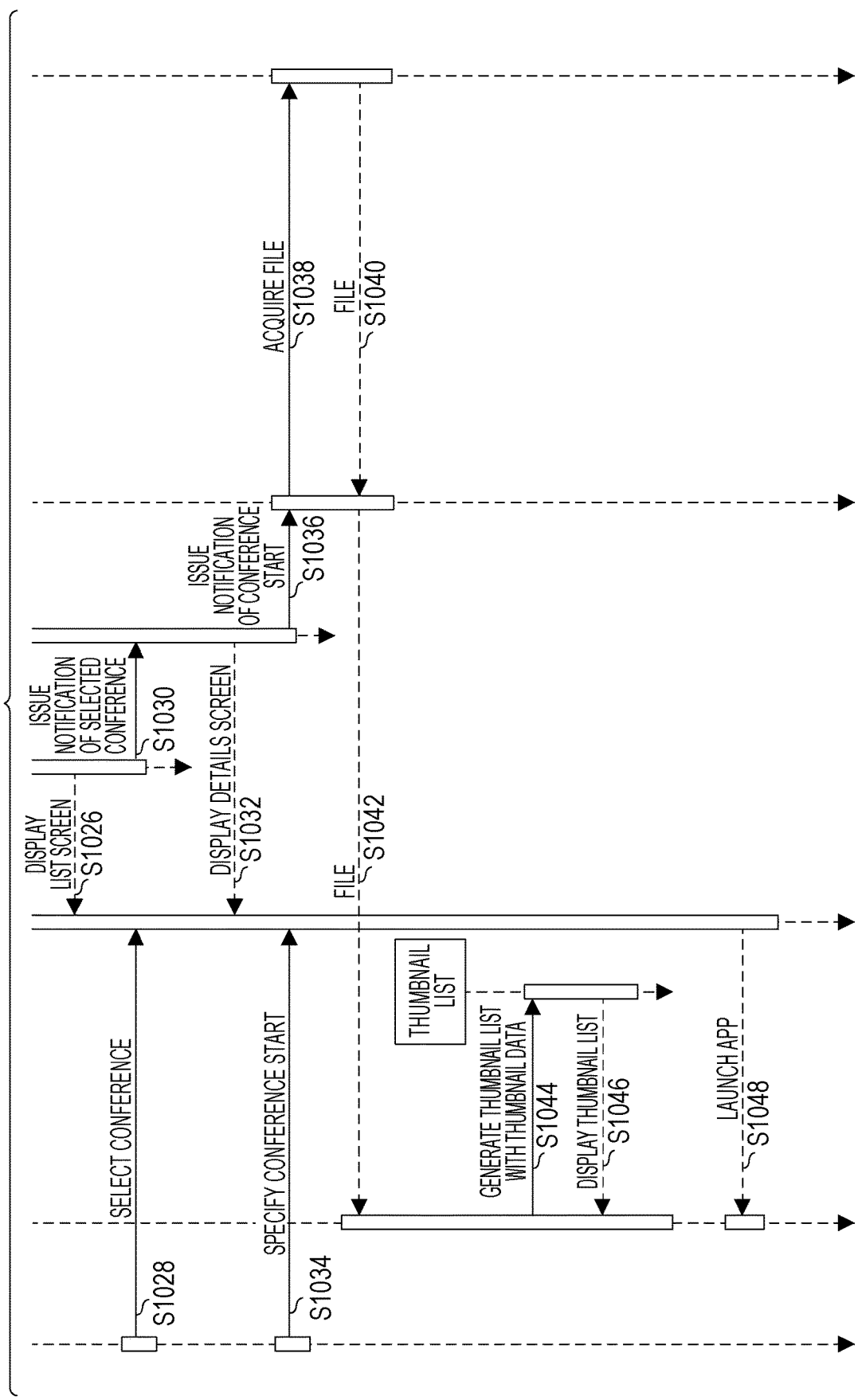

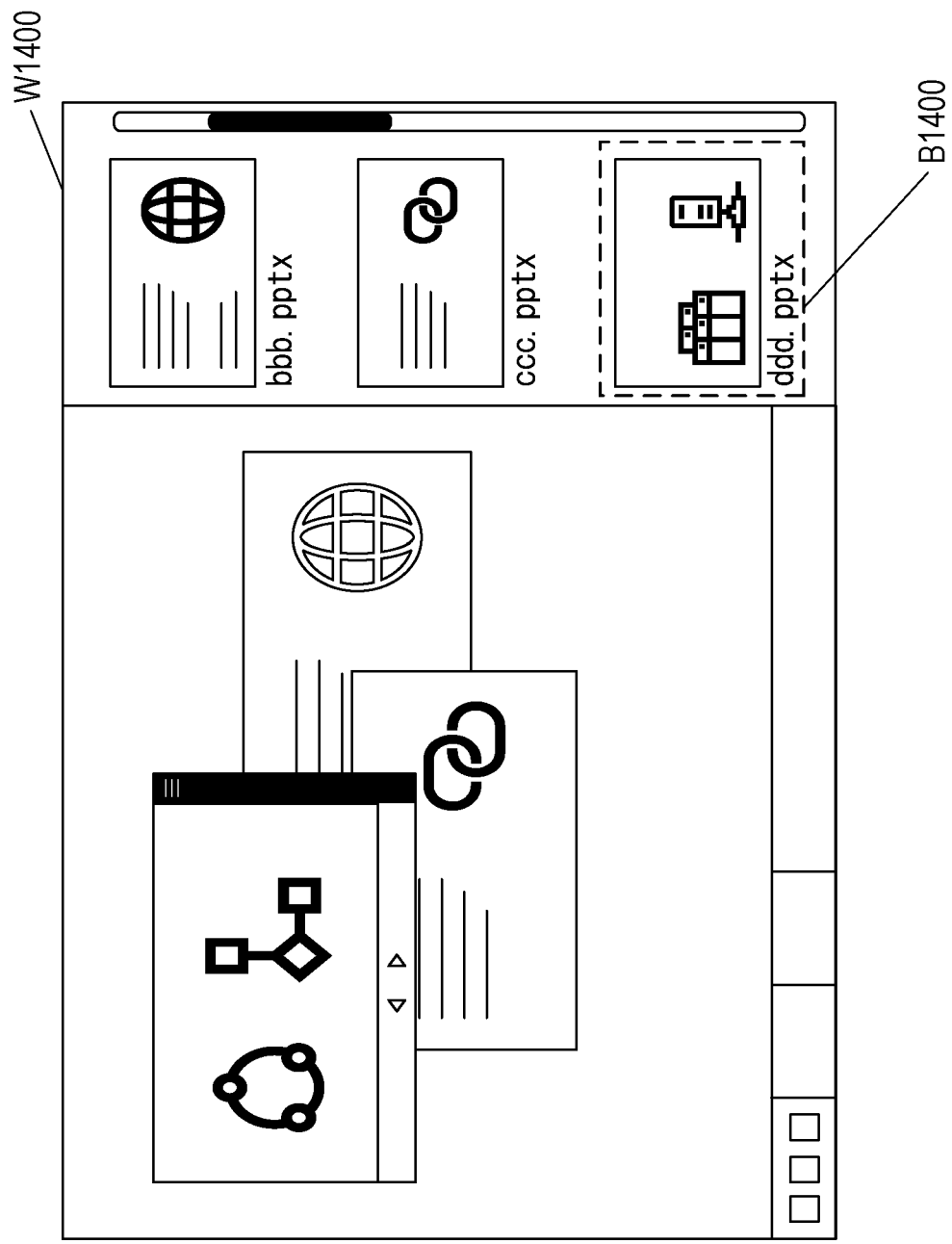

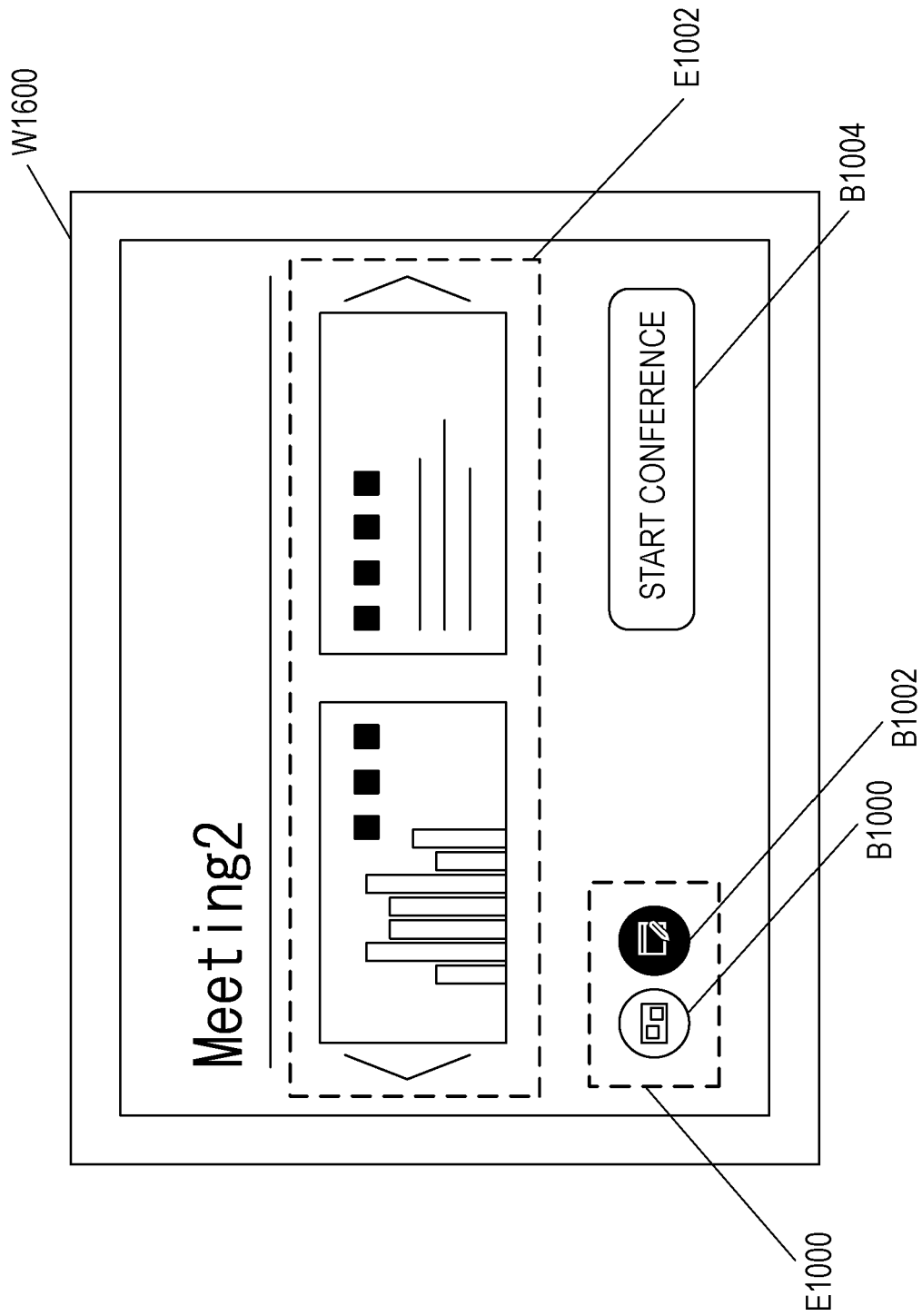

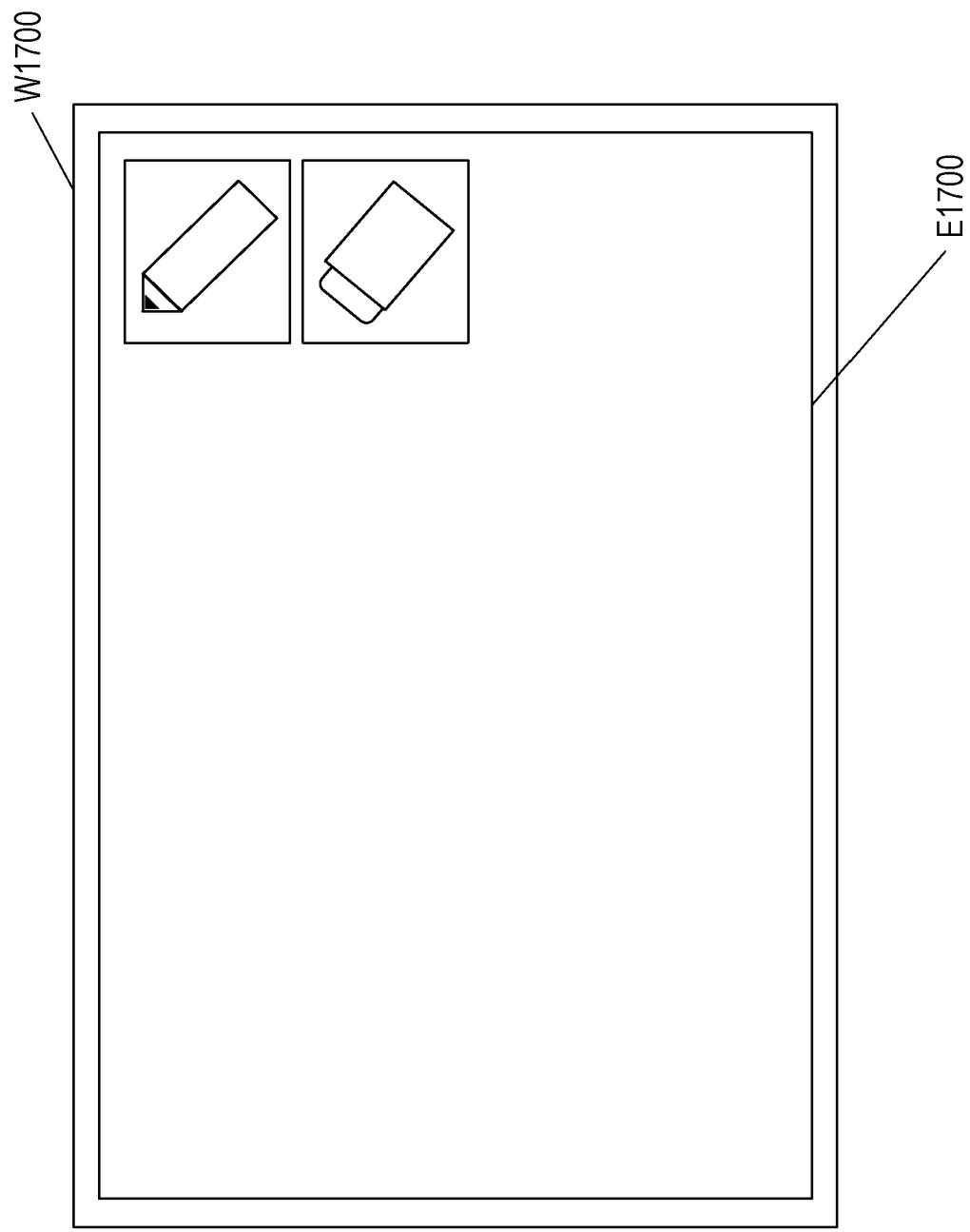

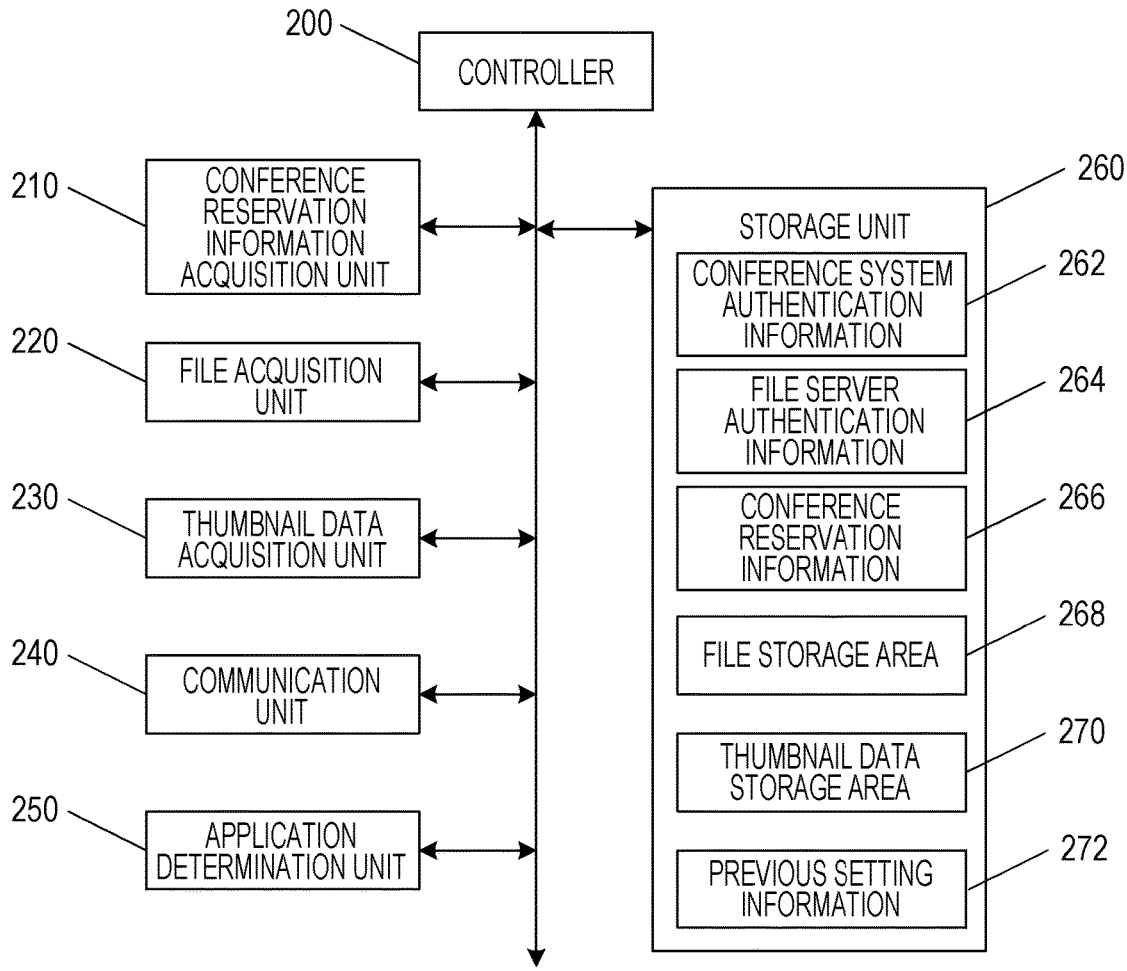

| USER NAME | SHARED FILE STORAGE DESTINATION |
|---|---|
| SUZUKI | FileServerA/Users/SUZUKI |
| TAKAHASHI | FileServerA/Users/TAKAHASHI |
| ⋮ | ⋮ |

INFORMATION PROCESSING DEVICE, INFORMATION PROCESSING SYSTEM, AND INFORMATION PROCESSING METHOD

BACKGROUND

1. Field

The present disclosure relates to an information processing device, system, and method.

2. Description of the Related Art

Recently, in conferences, meetings, lectures, and the like, the usage of systems capable of displaying materials is becoming commonplace. For example, in a system used in a conference, materials to use in the conference are saved on a file server in advance, and when the conference is convened, displaying the materials on a large-screen display or the like makes it possible to share information with attendees of the conference. Also, an application (conference program) executed on the large-screen display may be utilized to proceed with the conference efficiently.

In this regard, there has been proposed technology that determines whether or not to launch an application executed on a large-screen display according to a condition. For example, there has been proposed an electronic conference system provided with a conference management terminal manage by an electronic conference and attendee terminals applied to attendance to the electronic conference, in which the conference management terminal includes a conference program applied to the electronic conference and a recognition count determination unit that determines a recognition count on the basis of the attendee terminals recognized by an attendee terminal recognition unit that recognizes the attendee terminals, and a conference program launching unit that launches the conference program when the recognition count determination unit determines that the recognition count is a preset set recognition count (for example, see Japanese Unexamined Patent Application Publication. No. 2011-223339).

However, with the method of Japanese Unexamined Patent Application Publication No. 2011-223339 described above, it is not possible to determine an application considered to be appropriate to use in the conference according to information about the conference (conference reservations or the presence of a file to use as materials), and when starting the conference, stand by in a state enabling the application to be launched immediately.

Also, even if an application frequently used in conferences is launched automatically, there may be a problem of launching an unwanted application in a conference, and being unable to start the conference smoothly.

In light of the challenges described above, it is desirable to provide an information processing device and the like capable of selecting an appropriate application on the basis of a determination of whether file acquisition is possible.

SUMMARY

According to an aspect of the disclosure, there is provided an information processing device connectible to a file server and a display control device capable of executing a selected application. The information processing device includes a controller that determines whether a predetermined file is acquirable from the file server, in which the controller selects a first application if the file is acquirable, and selects a second application different from the first application if the file is not acquirable.

According to another aspect of the disclosure, there is provided an information processing system including an information processing device connectible to a file server, and a display control device that controls a display device. The information processing device includes a controller that determines whether a predetermined file is acquirable from the file server. The controller selects a first application if the file is acquirable, and selects a second application different from the first application if the file is not acquirable. The display control device includes a display controller that acquires information about an application selected by the controller from the information processing device, and causes the display device to display the application based on the information about the application.

According to another aspect of the disclosure, there is provided an information processing method in an information processing device connectible to a file server and a display control device capable of executing a selected application. The information processing method includes determining whether a predetermined file is acquirable from the file server, selecting a first application if the file is acquirable, and selecting a second application different from the first application if the file is not acquirable.

BRIEF DESCRIPTION OF THE DRAWINGS

FIG. 4 is a diagram illustrating one example of a data structure of application information according to the first embodiment;

FIG. 5 is a diagram illustrating one example of a data structure of system authentication information according to the first embodiment;

FIG. 6 is a diagram illustrating one example of a data structure of file server authentication information according to the first embodiment;

FIG. 7 is a diagram illustrating one example of a data structure of conference reservation information according to the first embodiment;

FIGS. 11A and 11B are diagrams for explaining a sequence according to the first embodiment;

FIGS. 18A and 18B are diagrams for explaining example operations according to the first embodiment;

FIGS. 19A and 19B are diagrams for explaining example operations according to the first embodiment;

FIG. 21 is a diagram for explaining a functional configuration of a conference management server according to a third embodiment;

FIG. 22 is a diagram illustrating one example of a data structure of previous setting information according to the third embodiment;

DESCRIPTION OF THE EMBODIMENTS

Hereinafter, exemplary embodiments of the present disclosure will be described with reference to the drawings. In the following description, as one example of the present disclosure, a case of applying an information processing device of the present disclosure to a conference system will be described. Note that in the present embodiment, a system used in a conference is described as an example, but obviously the present embodiment is applicable to simple presentations and educational systems such as lectures (classes), for example.

1. First Embodiment

First, a first embodiment will be described. In the conference system of the first embodiment, on the basis of reservation information related to a reservation of a conference (hereinafter called "conference reservation information"), a display control device stands by in a state able to launch an appropriate application, and displays a file to be used in the conference. Note that in the present embodiment, a conference refers to predetermined attendees gathering at a predetermined time and a predetermined place to share information and discuss a topic, and is assumed to include meetings, debates, lectures, and the like.

The conference reservation information is reservation information related to a reservation of a conference, and is created when a user reserves a conference. The conference reservation information includes information such as a conference name for the conference, a scheduled start time, a scheduled end time, and attendees. Additionally, information such as the meeting place and whether or not to perform teleconferencing may also be included.

Furthermore, the conference reservation information may include information for specifying a file storage destination where a file used in the conference is stored. A file used in the conference may be a file that is attached when reserving the conference, a file managed in the system that has reserved the conferenced, or a file set to be shared by a user. The file storage destination is information enabling the specification of a file server or location (path) where the file is stored, and conference reservation information that includes information about the file storage destination is specification information.

1.1 Overall Configuration

Figure 1:
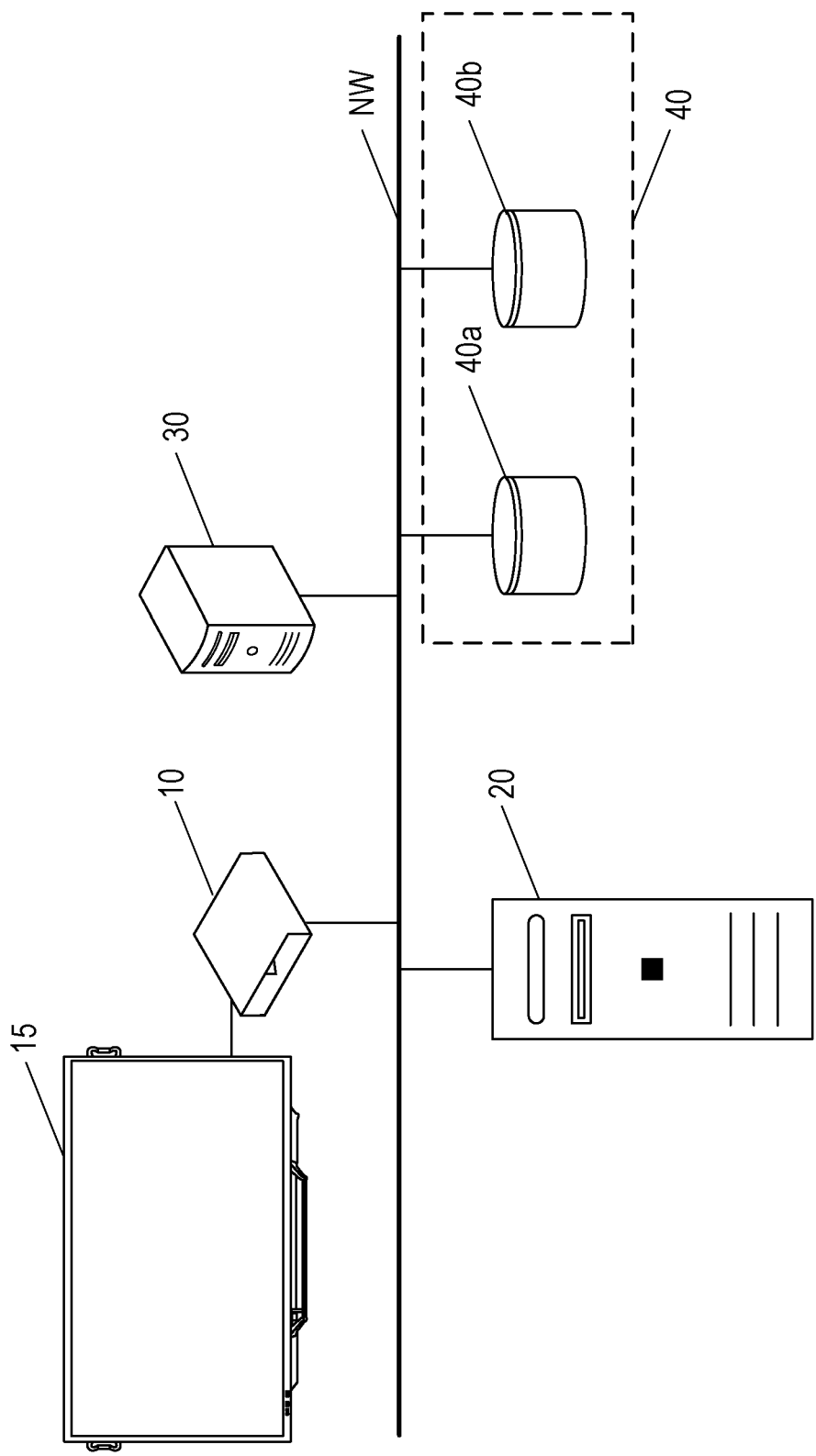
FIG. 1 is a diagram for explaining as overall configuration of a conference system according to a first embodiment.

An overall configuration of a conference system 1 of the present embodiment will be described on the basis of FIG. 1. As illustrated in FIG. 1, the conference system 1 includes a display control device 10, a display device 15, a conference management server 20 that acts as an information processing device, a conference reservation information management server 30 that acts as a specification information management device that manages the conference reservation information. (specification information), and a file server 40 (40a, 40b) that stores files. The above devices are connected via a network NW.

The network NW may be an internal network such as a LAN, or an external network such as the Internet. Also, it is sufficient for each device to be able to connect to the network NW in a wired or wireless manner.

Herein, the display device 15 is a device provided with a display unit, in which the display on the display unit is controlled by the display control device 10. The display unit may be a liquid crystal display (LCD), an organic electroluminescence display (OELD), or the like, for example. Also, in the present embodiment, by overlaying an operation detection unit onto the display unit, the display device is configured as a touch panel. The method of detecting touch may be any method, such as a capacitive method, a resistive method, or an infrared method.

The conference management server 20 is an information processing device that acquires conference reservation information managed by the conference reservation information management server 30, file and thumbnail data stored in the file server 40, and the like, and transmits to the display control device 10. The conference management server 20 is a device such as a computer, for example.

The conference reservation information management server 30 is a specification information management device that manages the conference reservation information, that is, specification information created by the user in the system that reserves conferences, and is a device such as a computer, for example.

The file server 40 is a device capable of storing files that express content such as documents, images, and video. The file server 40 may be a standalone file management server or utilize network-attached storage (NAS), and may also be cloud storage. Also, each user may be assigned one's own storage area (for example, an area having a configurable predetermined capacity, such as a storage device or a directory).

In the present embodiment, the file server 40 stores thumbnail data corresponding to stored files. The thumbnail data may be created on the basis of any of the files. For example, the conference management server 20 may connect to the file server 40 periodically, generate thumbnail data on the basis of files stored in the file server 40, and cause the thumbnail data to be stored in the file server 40, or the thumbnail data may e generated when a file is stored.

1.2 Functional Configuration

1.2.1 Display Control Device

A functional configuration of the display control device 10 will be described with reference to FIG. 2. The display control device 10 is provided with a controller 100, an output unit 110, an operation input unit 120, an image processing unit 130, a communication unit 140, and a storage unit 150.

The controller 100 is a functional unit for controlling the display control device 10 as a whole. The controller 100 realizes various functions by reading out and executing various programs, and includes a central processing unit (CPU) or the like, for example.

The various programs include a conference management application 152, a file display application 154, and a handwriting/drawing application 156 described later, and the like.

The output unit 110 is a functional unit that outputs an image signal to be displayed by the display unit of the display device 15. For example, the output unit 110 includes an interface such as an HEMI (registered trademark) or VGA port.

The operation input unit 120 receives operation input from a user. For example, a touch position of a touch operation performed on the display device 15 is input, or operation input by an external input device such as a mouse or keyboard is input.

The image processing unit 130 is a functional unit that performs various image processing on image data. For example, a sharpening process is performed on a thumbnail image, or image processing is performed when displaying a file.

The communication unit 140 is a functional unit by which the display control device 10 connects to the network NW and communicates with other devices. For example, the communication unit 140 is realized by a network interface card (NIC) used in a wired/wireless LAN, or a communication module capable of connecting to a 3G/LTE network.

The storage unit 150 is a functional unit that stores various programs and various data relevant to the operation of the display control device 10. For example, the storage unit 150 includes a solid-state drive (SSD) that is semiconductor memory, a hard disk drive (HDD), or the like.

The storage unit 150 stores the conference management application 152, the file display application 154 that is a first application, and the handwriting/drawing application 156 that is a second application, and additionally secures a file storage area 158 and a thumbnail data storage area 160 as storage areas.

The conference management application 152 is an application for enabling the user to select conference reservation information received from the conference management server 20, and for receiving an instruction to start a conference. Also, the conference management application 152 receives the presence or absence of a reserved conference, a file, and thumbnail data from the conference management server 20, and displays a thumbnail list on the basis of the thumbnail data. When thumbnail data is selected by a user, the file corresponding to the selected Thumbnail data is downloaded and passed to another application.

The file display application 154 is an application executed by the display control device 10, and is capable of causing one or multiple files stored in the file storage area 158 to be displayed in a predetermined area of the display device 15.

The handwriting/drawing application 156 is an application executed by the display control device 10, and is an application that draws lines based on handwriting input operations input from the operation input unit 120 in a predetermined area on the display unit of the display device 15.

Herein, the first application is an application of high utility for checking files and content. For example, a work area is provided in a first layer, and a second layer is displayed overlaid onto the first layer. By displaying content in the second layer, it is possible to move the content freely on top of the work area (first layer).

Also, handwriting input is drawable on top of the content displayed in the second layer. An object drawn by handwriting input may be stored together with the second or stored as a third layer.

Also, a management tool for managing this content is displayed. With the management tool, content (files) may be switched or collected together. Note that the content is displayed inside the work area, but a full-screen display option may also be configured.

In contrast, the second application refers to an application suited to handwriting/drawing. For example, a nearly full-screen drawing area (drawing layer) may be provided, and drawings may be placed as objects in the drawing area. Note that in this case, other content may also be displayed on to of the drawing area (drawing layer).

In other words, by using the second application, it is possible to provide a usage method such as an electronic blackboard or an electronic whiteboard. The first application places content (objects) in the second layer on top of the first layer, and performs operations on the content placed in the second layer. In contrast, the second application performs operations such as directly drawing onto the first layer (drawing layer).

Since the first application performs operations on objects in the second layer on top of the first layer, operations such as the display of a file for example may be realized easily. Since the second application is able to perform direct operations on the first layer, an electronic blackboard and the like for example may be realized easily.

Also, for example, in the case of the second application, a background screen (for example, a white screen) may be drawn, and direct drawing operations and the like may be performed on the background screen. With this arrangement, the function of an electronic blackboard (electronic whiteboard) may be realized easily.

The file storage area 158 is an area that stores files received from the conference management server 20. Also, the thumbnail data storage area 160 is an area that stores thumbnail data received from the conference management server 20.

1.2.2 Conference Management Server

A functional configuration of the conference management server 20 will be described with reference to FIG. 3. The conference management server 20 is provided with a controller 200, a conference reservation information acquisition unit 210, a file acquisition unit 220, a thumbnail data acquisition unit 230, a communication unit 240, an application determination unit 250, and a storage unit 260.

The controller 200 is a functional unit for controlling the conference management server 20 as a whole. The controller 200 realizes various functions by reading out and executing various programs, and includes a CPU or the like, for example.

The conference reservation information acquisition unit 210 is a functional unit that connects to the conference reservation information management server 30 and acquires conference reservation information. Information about the conference reservation information management server 30 to connect to (such as the connection destination and authentication information for logging in to the conference reservation information management server 30, for example) may be stored in the conference reservation information acquisition unit 210 or stored in the storage unit 260.

The file acquisition unit 220 is a functional unit that connects to the file server 40 and acquires a file stored in the file server 40. Also, the thumbnail data acquisition unit 230 is a functional unit that connects to the file server 40 and acquires thumbnail data stored in the file server 40. Also, the file server 40 to connect to and a location (path) to reference for acquiring a file and thumbnail data is decided on the basis of information about a file storage destination in the conference reservation information 266 described later.

The communication unit 240 is a functional unit by which the conference management server 20 connects to the network NW and communicates with other devices. For example, the communication unit 240 is realized by a NIC used in a wired/wireless LAN, or a communication module capable of connecting to a 3G/LTE network.

The application determination unit 250 is a functional unit that determines an application appropriate as the application to use in a conference, on the basis of the conference reservation information. The determination of the application is performed by associating conditions and applications in advance, and determining the application by checking each conference against the conditions, for example.

A specific example will be described with reference to FIG. 4. FIG. 4 is a table (application selection table) in which conditions (for example, "file exists") and applications (for example, "file display application") to select in the case of a matching condition are stored. In the present embodiment, the application selection table is described as being held in the application determination unit 250, but the application selection table may also be stored in the storage unit 260 and read out by the application determination unit 250 as appropriate.

Also, "file exists" indicates a case in which a file to use in a conference exists. In this case, a file display application is selected to enable the display of the file to use in the conference. "No file exists" indicates a case in which a file to use in a conference does not exist. In this case, a handwriting/drawing application is selected. Note that obviously conditions other than the conditions described above may also be set.

The storage unit 260 is a functional unit that stores various programs and various data relevant to the operation of the conference management server 20. For example, the storage unit 260 includes an SSD that is semiconductor memory, an HDD, or the like.

In particular, the storage unit 260 stores conference system authentication information 262, file server authentication information 264, and conference reservation information 266. Also, a file storage area 268 and a thumbnail data storage area 270 are secured as storage areas.

In the conference system authentication information 262, authentication information used to log in to the conference system 1 is stored. As one example, as illustrated in FIG. 5, the conference system authentication information 262 includes a user name (for example "SUZUKI") for identifying a user and a password (for example, "SUZUKI1234") that the user specified by the user name uses to log in to the conference system 1.

In the file server authentication information 264, authentication information used to log in to the file server 40 is stored. As one example, as illustrated in FIG. 6, the file server authentication information 264 includes a user name (for example "SUZUKI") for identifying a user and a password (for example, "aaa123") that the user specified by the user name uses to log in to the file server 40.

Note that the file server authentication information 264 may also be stored in each file server 40. In this case, a file server name for specifying the file server 40, a user name, and an account name and password for logging in are stored.

In the conference reservation information 266, information related to the reservation of a conference is stored. As one example, as illustrated in FIG. 7, there are stored a conference ID (for example, "KaigiA") for specifying a conference, a conference name (for example, "2019 Model Information Sharing") that is the name of the conference, a time (for example, "2017/10/14 15:00-16:00") indicating the scheduled start time and the scheduled end time of the conference, attendee user names (for example, "SUZUKI, TAKAHASHI, TANAKA") for specifying users who will attend the conference, and a file storage destination (for example, "FileServerA/KaigiA/171013") for specifying a location where a file to be used in the conference is stored.

The file storage destination stores information for specifying a file server and location (path) where a file to be used in the conference is stored. One or multiple locations may be specified by the file storage destination, and a location of the file storage destination does not have to be specified.

The file storage area 268 is an area that stores a file acquired by the file acquisition unit 220. Also, the thumbnail data storage area 270 is an area that stores thumbnail data acquired by the thumbnail data acquisition unit 230.

1.2.3 Conference Reservation Information Management Server

Figure 8:
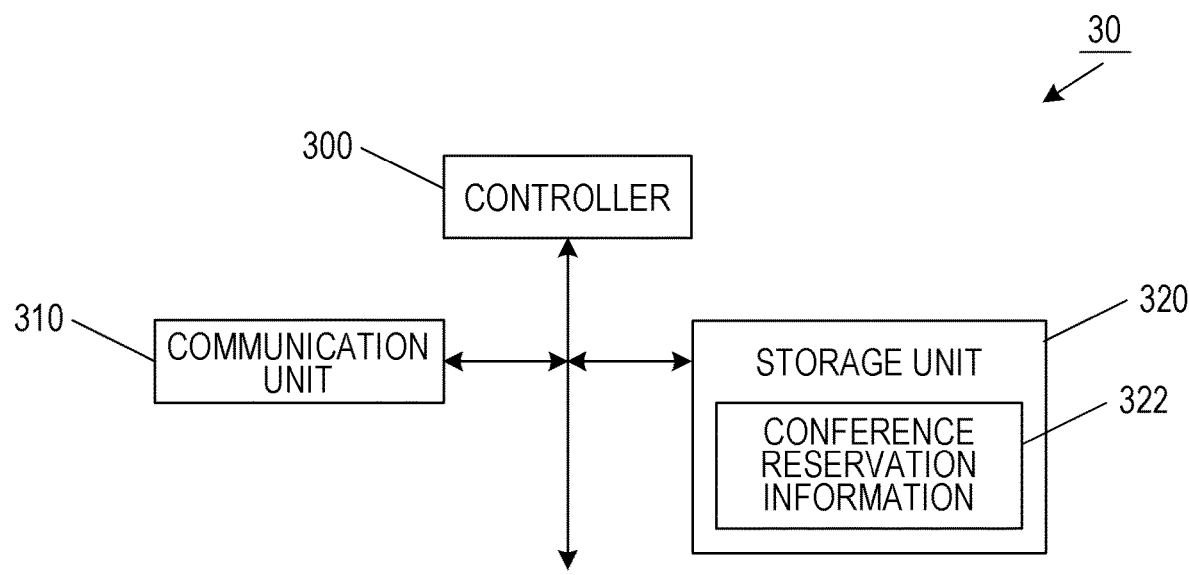
FIG. 8 is a diagram for explaining a functional configuration of a conference reservation information management server according to the first embodiment.

A functional configuration of the conference reservation information management server 30 will be described with reference to FIG. 8. The conference reservation information management server 30 is provided with a controller 300, a communication unit 310, and a storage unit 320.

The controller 300 is a functional unit for controlling the conference reservation information management server 30 as a whole. The controller 300 realizes various functions by reading out and executing various programs, and includes a CPU or the like, for example.

The communication unit 310 is a functional unit by which the conference reservation information management server 30 connects to the network NW and communicates with other devices. For example, the communication unit 140 is realized by a network interface card (NIC) used in a wired/wireless LAN, or a communication module capable of connecting to a 3G/LTE network.

The storage unit 320 is a functional unit that stores various programs and various data relevant to the operation of the conference reservation information management server 30. For example, the storage unit 320 includes an SSD that is semiconductor memory, an HDD, or the like.

In particular, the storage unit 320 stores conference reservation information 322. In the conference reservation information 322, information related to the reservation of a conference is stored. Similarly to the conference reservation information 266, the conference reservation information stored in the conference reservation information 322 includes a conference ID, a conference name, a time, attendee user names, a file storage destination, and the actual data of the file.

In the case in which the conference reservation information management server 30 receives information related to the reservation of a conference, the conference reservation information 322 is stored on the basis of the received information. The case of receiving information related to the reservation of a conference refers to the case of receiving an email including information about the schedule start time of the conference, the scheduled end time of the conference, the attendees, the file storage destination, and the actual data of the file, or the case in which a screen for registering conference reservation information is provided, and the information is input by a user from the screen. Also, the conference reservation information management server 30 may request information related to the reservation of a conference from a service able to reserve a conference, and register the conference reservation information 322 on the basis of the acquired information. Also, the conference reservation information 322 may be registered on the basis of information related to the reservation of a conference issued in a notification from the service able to reserve a conference.

1.2.4 File Server

Figure 9:
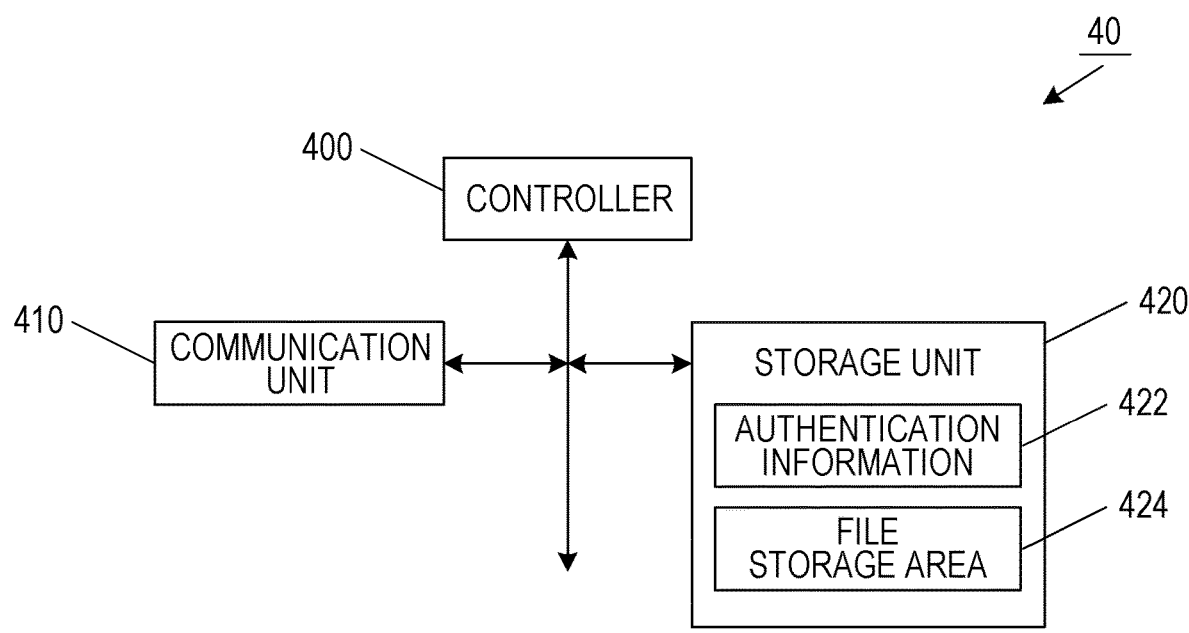
FIG. 9 is a diagram for explaining a functional configuration of a file server according to the first embodiment.

A functional configuration of the file server 40 will be described with reference to FIG. 9. The file server 40 is provided with a controller 400, a communication unit 410, and a storage unit 420.

The controller 400 is a functional unit for controlling the file server 40 as a whole. The controller 400 realizes various functions by reading out and executing various programs, and includes a CPU or the like, for example.

The communication unit 410 is a functional unit by which the file server 40 connects to the network NW and communicates with other devices. For example, the communication unit 240 is realized by a NIC used in a wired/wireless LAN, or a communication module capable of connecting to a 3G/LTE network.

The storage unit 420 is a functional unit that stores various programs and various data relevant to the operation of the file server 40. For example, the storage unit 420 includes an SSD that is semiconductor memory, an HDD, or the like.

In particular, the storage unit 420 stores authentication information 422, and additionally is provided with a file storage area 424.

In the authentication information 422, information for authenticating a user who acquires a file stored in the file storage area 424 is stored. For example, a user name and password are stored.

In the file storage area 424, files are stored. For example, the actual data of a file attached when reserving a conference or a file registered in the system able to reserve a conference is stored. Files may be stored for each conference name or date, or may be stored on the basis of a storage method in the system able to reserve a conference. Also, files may be stored in the user's own storage area, or may be stored in a storage area shared by multiple users.

Figure 10:
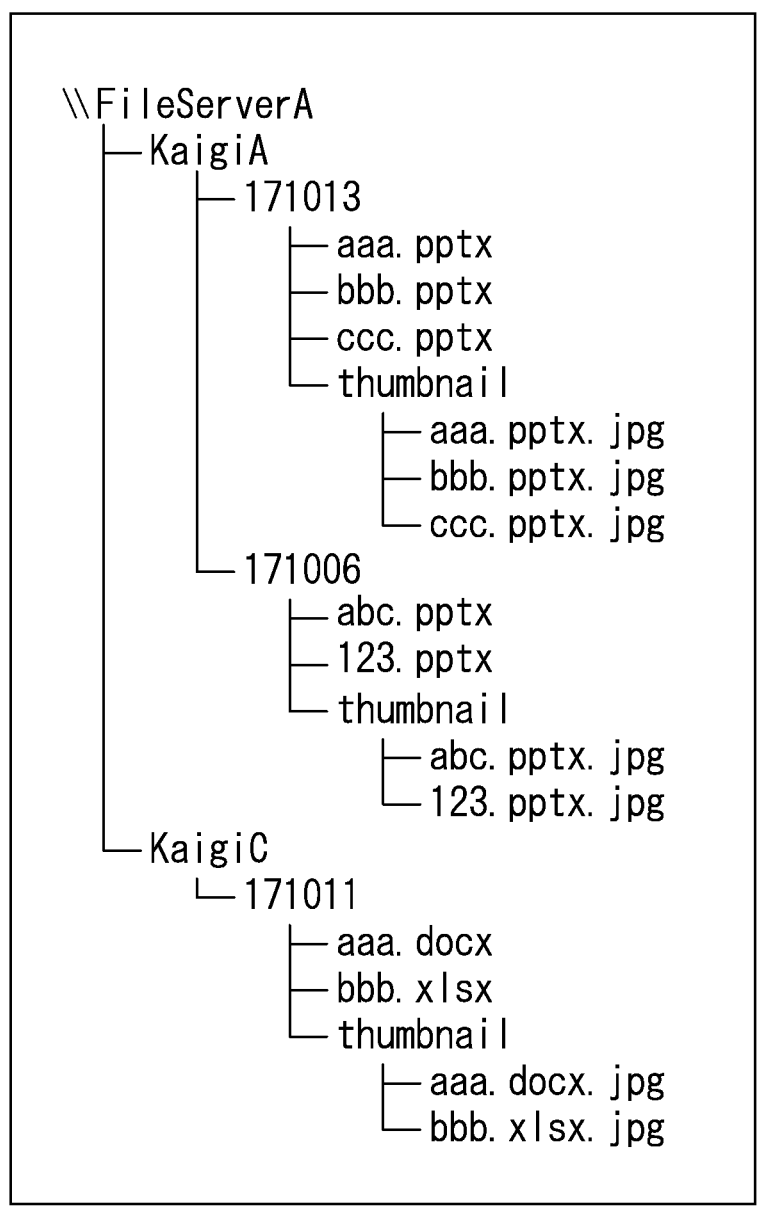
FIG. 10 is a diagram illustrating one example of a file structure of a file storage area accord ng to the first embodiment.

One example of files stored in the file storage area 424 is illustrated in FIG. 10. In the example of FIG. 10, a directory having the conference ID as the directory name (for example, "KaigiA") is stored for each conference, and in that directory, directories are stored for each date (for example, "171013"). Note that it is sufficient to create the directories for each date on the basis of the date indicated by the scheduled start time of a conference.

In the directories for each date, there are stored files (for example, "aaa.pptx") and a directory (for example, "thumbnail") for storing thumbnail data of the files. In the directory that stores thumbnail data, thumbnail data (for example, "aaa.pptx.jpg") is stored. In the present embodiment, the file names of thumbnail data are associated with the corresponding files by adding ".jpg" to the end of the file name of the file corresponding to the thumbnail data.

The thumbnail data may be generated by the file server 40 and stored in the storage unit 420 when a file is stored in the file storage area 424. Also, another device (for example, the conference management server 20) may periodically reference the files stored in the file storage area 424, generate thumbnail data, and cause the generated thumbnail data to be stored in the storage unit 420.

In the case of transmitting a file stored in the file storage area 424 to an external device (for example, the conference management server 20), the file server 40 performs the following procedure. First, an authentication request including an account name and password is received from the external device via the communication unit 410, and in the case in which the account name and password are included in the authentication information 422, the user specified by the account name is authenticated. Next, when an acquisition request, that is, a request for acquiring information, is received, in the case in which the acquisition request is by an authenticated user, on the basis of the acquisition request, a file stored in the file storage area 424 is transmitted to the device that transmitted the acquisition request.

Note that in the case in which a user is not authenticated, or in the case in which an authenticated user does not have the rights to reference the specified file or file information, the file server 40 may also transmit information indicating that the file is not available for acquisition to the source of the authentication request or acquisition request.

1.3 Process Flow

1.3.1 Overall Flow

Figure 11A:
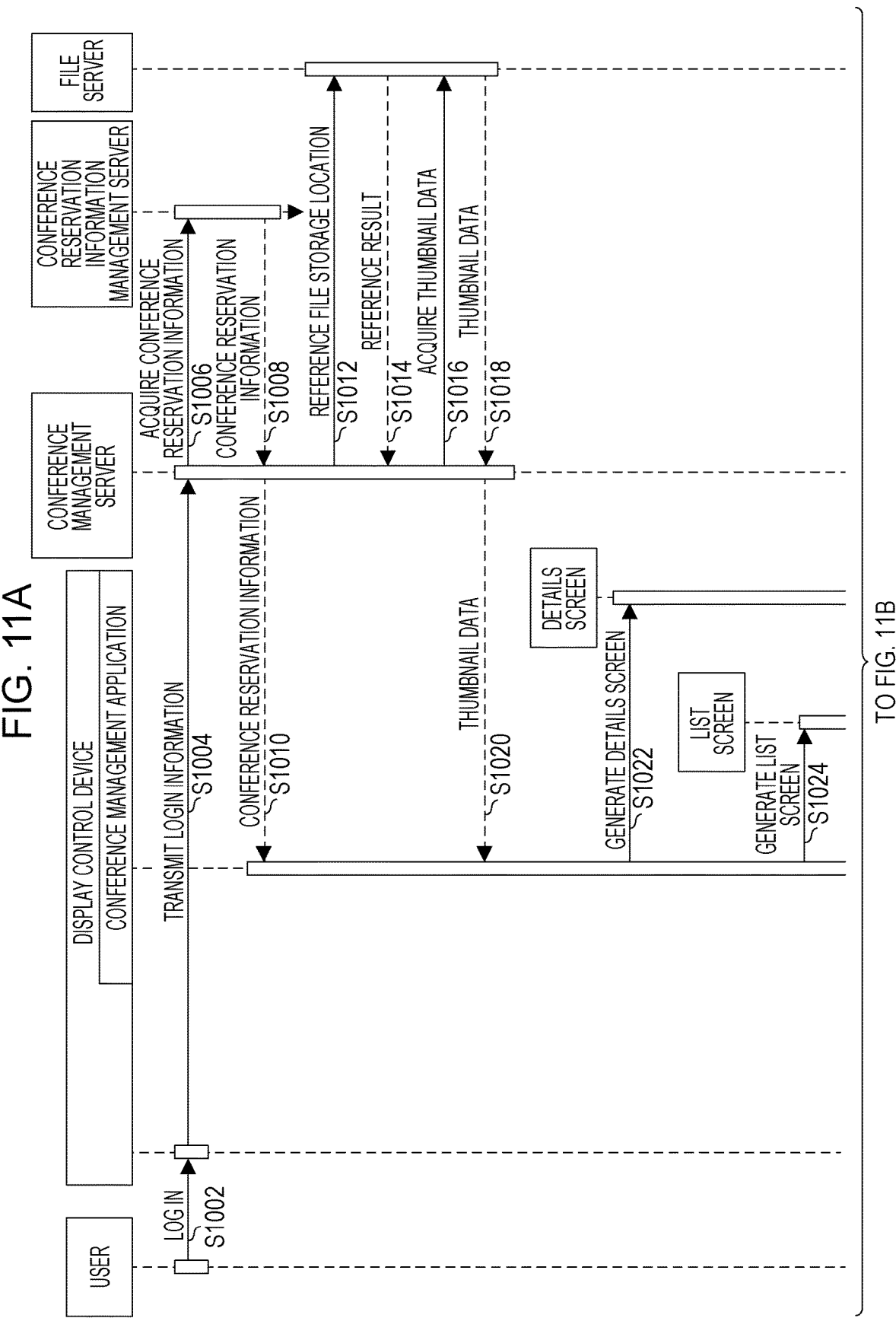

FIGS. 11A and 11B be referenced to describe an overall flow of the conference system in the present embodiment. Note that processes realized by the conference management application 152 are included as part of the processes of the display control device 10.

First, a user logs in to the conference system 1 (S1002). For example, the user may input information used to log in (login information) such as a user name and password, or bring into proximity a card on which login information is stored.

Next, the display control device 10 transmits the login information to the conference management server 20 (S1004). The conference management server 20 determines whether or not the received login information is included in the conference system authentication information 262. In the case in which the received login information is included in the conference system authentication information 262, the user is authenticated on the basis of the received login information.

Next, the conference management server 20 transmits a request to acquire conference reservation information to the conference reservation information management server 30 (S1006). Also, the conference management server 20 receives a response from the conference reservation information management server 30, namely the conference reservation information (S1008), and transmits the response to the transmission source of the login information, namely the display control device 10 (21010). At this time, multiple pieces of conference reservation information may be transmitted.

The conference reservation information transmitted by the conference management server 20 in S1010 is conference reservation information in which the user name of the user who logged in (login user name) is included among the attendee user names, on the basis of the login information received by the conference management server 20 in S1004. Accordingly, a process of extracting the conference reservation information in which the login user name is included among the attendee user names from the conference reservation information stored by the conference reservation information management server 30 is performed. The extraction process may be performed by the conference management server 20 or by the conference reservation information management server 30. In the case in which the conference management server 20 performs the extraction of conference reservation information, it is sufficient to extract the conference reservation information in which the login user name is included among the attendee users from the conference reservation information acquired from the conference reservation information management server 30. Also, in the case in which the conference reservation information management server 30 performs a filtering process, the following procedure is performed. First, in S1006, the conference management server 20 transmits a request to acquire conference reservation information together with the login user name to the conference reservation information management server 30. Next, in S1008, the conference reservation information management server 30 transmits the conference reservation information in which the login user name is included among the attendee users to the conference management server 20. According to this procedure, the conference management server 20 is able to acquire the conference reservation information in which the login user name is included among the attendee user names from the conference reservation information management server 30.

Also, in S1010, the presence or absence of a reservation is issued in a notification to the display control device 10 from the conference management server 20.

Specific examples of the case in which a reservation exists are given below.

(1) Case in which Conference Reservation Information Exists in which Current Time is Close to Start Time of Conference This is a case in which there exists conference reservation information for which the current time is included in a predetermined time before (for example, 10 minutes before) the scheduled start time of a conference. Specifically, this is the case in which the user logs in to the conference system 1 in advance, before the scheduled start time of the conference.

(2) Case in which Current Time is Included Between Scheduled Start Time and Scheduled End Time of Conference This is a case in which there exists conference reservation information for which the current time is included in the time period during which the conference is scheduled to be held. Specifically, this is the case in which the user logs in to the conference system 1 during the scheduled time of the conference.

Also, on the basis of the conference reservation information received in S1008, the conference management server 20 references the file storage destination of the file server 40 where a file related to the conference is stored (S1012). In the case in which user authentication is demanded to reference the file server 40, file server authentication information corresponding to the login user name is read out from the file server authentication information 264, and the user is logged in to the file server 40. Also, the conference management server 20 receives a reference result transmitted from the file server 40 (S1014). The reference result is information indicating whether or not the conference management server 20 has successfully referenced a file stored in the file storage destination, and may be the stored file, or information indicating the presence or absence of a directory at the storage destination.

In the case in which the reference result indicates that the conference management server 20 has successfully referenced a file in the file storage destination, the conference management server 20 transmits to the file server 40 a request to acquire thumbnail data stored in the file server 40 (S1016). Subsequently, the conference management server 20 receives thumbnail data from the file server 40 (S1018). Additionally, the conference management server 20 transmits the received thumbnail data to the display control device 10 that is the transmission source of the login information (S1020).

Also, in the conference management server 20, the application determination unit 250 determines the application selected by the display control device 10 on the basis of the processing results from S1012 to S1018. The conference management server 20 transmits information related to the determined application (determined application information) together with the thumbnail data to the display control device 10. In the present embodiment, the determined application information is taken to be the name of the application (for example, "file display application"). Also, the determined application information is transmitted to be identifiable for each piece of conference reservation information.

At this point, in the display control device 10, the conference management application 152 is running. The conference management application 152, on the basis of the conference reservation information received in S1010 together with the notification information, generates a details screen (S1022) or generates a list screen (S1024).

In the case in which the conference management server 20 notifies that a reservation exists, the display control device 10 displays the details screen. The details screen is a screen that displays the conference name, the conference time, the attendee user names, the thumbnail data of any files used in the conference, icons enabling the selection of an application to launch when starting the conference, and a button (Start Conference button) for receiving an instruction to start the conference. In the present embodiment, either of the file display application 154 that is the first application and the handwriting/drawing application 156 that is the second application is selectable as the application to launch when starting the conference. Consequently, two icons for the file display application 154 and the handwriting/drawing application 156 are displayed.

Also, the display control device 10 identifiably displays the icon selected as the application to launch when starting the conference. Identifiably displaying an icon means, for example, highlighting the icon, applying a color to the periphery of the icon, or enlarging the icon.

At this point, when the details screen is displayed, the application to launch when starting the conference is selected on the basis of the determined application information transmitted from the conference management server 20 in S1020. With this arrangement, the user is able to recognize the application selected by the conference management server 20. Note that in the case in which the user does not desire to launch the application selected on the basis of the determined application information, the user may select the application to launch when starting the conference.

In the case in which the conference management server 20 notifies that a reservation does not exist, the display control device 10 displays the conference list screen. The list screen is a screen that displays the conference reservation information received in S1010 in a list format. On the list screen, information such as conference names, conference times, attendees, and representative thumbnail data is displayed. The user checks the displayed list screen, and selects a conference to start.

At this point, the representative thumbnail data displayed on the list screen may be one piece of the thumbnail data received in S1020, or alternatively, information specifying representative thumbnail data may be included in the conference reservation information, and the thumbnail data specified from the information may be displayed.

Note that in S1010, instead of issuing a notification of the presence or absence of a reservation, the conference management server 20 may notify the display control device 10 of information indicating to display the details screen or information indicating to display the list screen, depending on the presence or absence of a reservation. On the basis of the received notification, the display control device 10 displays the details screen or the list screen.

The conference management application 152, by displaying the list screen generated in S1024 (S1026), causes the user to select a conference displayed on the list screen. When a conference is selected by the user (S1028), the list screen notifies the details screen of the selected conference (S1030). Note that in the case in which the details screen has not been generated, the details screen is generated at this time. On the basis of the conference indicated by the notification, the details screen displays information about the conference displayed on the details screen and thumbnail data. Additionally, the conference management application 152 displays the updated details screen (S1032).

At this point, the user checking the details screen issues an instruction to start the conference by selecting the Start Conference button (S1034). The conference management application 152, when triggered by being instructed to start the conference, transmits a notification related to starting the conference (conference start not to the conference management server 20 (S1036). Note that the conference start notification includes conference specification information for specifying the conference reservation information. With this arrangement, it becomes possible for the conference management server 20 to specify which conference has started. The conference specification information may be the conference reservation information itself, or information by which conference reservation information may be uniquely identified, such as the conference ID.

The conference management server 20 receiving the conference start notification from the display control device 10 reads the conference reservation information specified by the conference specification information, on the basis of the conference specification information included in the conference start notification. Subsequently, the conference management server 20 requests the file server 40 designated as the file storage destination for the acquisition of a file related to the conference (S1038). The file server 40 transmits the file to the conference management server 20 (S1040). Next, the conference management server 20 transmits the file received from the file server 40 to the display control device 10 (S1042).

On the basis of the thumbnail data received in S1020, the display control device 10 generates a thumbnail list (S1044), and displays the thumbnail list on the display device 15 (S1046). The thumbnail list is a list that displays the thumbnail data, and by selecting a piece of thumbnail data, enables a file based on the selected thumbnail data to be opened, or to notify that the file has been selected by another application.

Furthermore, on the details screen, the conference management application 152 launches the application selected as the application so launch when starting the conference (S1048).

Note that in the case in which it is not necessary to display a file, such as when the application to launch when starting the conference does not have a function of displaying files, in S1036, the display control device 10 does not have to transmit the conference start not to the conference management server 20. In the case of not transmitting the conference start notification, since the processes from S1038 to S1042 are not performed, the display control device 10 does not receive a file stored in the file server 40. By transmitting or not transmitting the conference start notification depending on the application to launch, the process may be optimized.

According to the process described above, an application determined by the application determination unit 250 on the basis of the conference reservation information may be selected on the details screen. Consequently, for a conference that the user desires to start, an appropriate application may be launched when the conference is started.

Also, depending on the settings, the conference list and the details screen may be skipped, and an appropriate application may be launched. Furthermore, an appropriate application may be launched according to the presence or absence of a file on a server, or an appropriate application may be launched automatically from an application launch count or the like from an operation history of the user.

1.3.2 Process Flow of Conference Management Server

Figure 12:
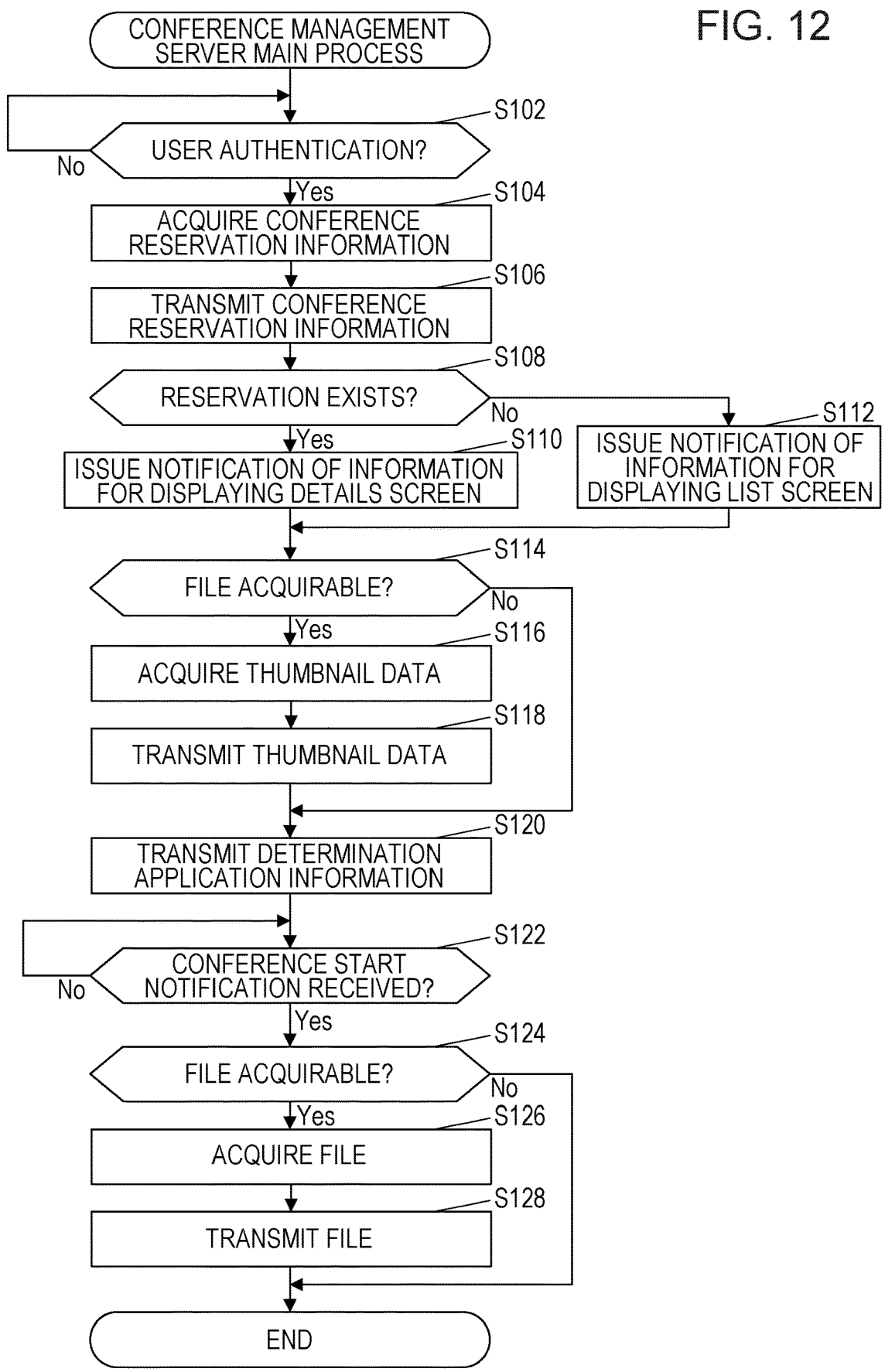
FIG. 12 is an operational flowchart for explaining a main process of a conference management server according to the first embodiment.

FIG. 12 will be referenced to describe the process flow of the conference management server 20. First, the controller 200 authenticates a user using the conference system 1 (step S102). In the present embodiment, user authentication is performed by comparing the conference system authentication information 262 and authentication information transmitted from the display control device 10. Note that user authentication may also be performed by transmitting authentication information to an authentication server, and receiving an authentication result transmitted from the authentication server.

If the controller 200 authenticates the user, the conference reservation information acquisition unit 210 acquires conference reservation information 322 from the conference reservation information management server 30, and stores the acquired information as the conference reservation information 266 (step S102; Yes→step S104). Note that the conference reservation information stored in the conference reservation information 266 is the conference reservation information extracted according to the login user name, as described in S1010. Also, the controller 200 transmits the conference reservation information 266 to the display control device 10 (step S106).

Next, the controller 200 determines whether or not a reservation exists from the conference reservation information 266 and the current time. If a reservation exists, the controller 200 notifies the display control device 10 of information indicating to display the details screen (step S108; Yes→step S110). If a reservation does not exist, the controller 200 notifies the display control device 10 of information indicating to display the list screen (step 3108; No→step S112).

Next, from the conference reservation information 266, the controller 200 determines whether a conference-related file is acquirable for each piece of conference reservation information (step S108). The case in which a conference-related file is acquirable refers to the case in which a file stored in the location specified by the file storage destination of the conference reservation information may be acquired successfully. The case in which a file is not acquirable refers to the case in which a conference-related file may not be acquired successfully as a result. Specifically, the non-acquirable case includes the case in which information about a file storage destination is not included in the conference reservation information, the case in which a file is not stored at the file storage destination, the case in which the conference management server 20 is unable to access the location specified by the file storage destination, and the like. In the case in which a file is not acquirable, the process proceeds to step S120 (step S114; No→step S120).

If a conference-related file is acquirable, the thumbnail data acquisition unit 230 acquires thumbnail data from the file server 40 for each piece of conference reservation information stored in the conference reservation information 266 (step S114; Yes→step S116). The thumbnail data is acquired on the basis of the method of storing thumbnail data in the file server 40. For example, if the method is storing thumbnail data according to a file structure as illustrated in FIG. 9, the "thumbnail" directory existing below the file storage destination is referenced, and the thumbnail data stored in the "thumbnail" directory is acquired. Also, the acquired Thumbnail data is stored in the thumbnail data storage area 270. At this time, the thumbnail data as stored to be identifiable for each conference ID and date, such as by generating a directory for each conference ID and date, and storing the thumbnail data in a corresponding directory.

Next, the controller 200 transmits the thumbnail data stored in the thumbnail data storage area 270 to the display control device 10 via the communication unit 240 (step S118). Also, the application determination unit 250 transmits determined application information to the display control device 10 for each piece of conference reservation information (step S120).

Next, the controller 200 determines whether or not a conference start notification transmitted from the display control device 10 has been received (step S122). The conference start notification is transmitted when the user instructs the display control device 10 to start a conference. Note that in the present embodiment as described above, the conference start notification includes conference specification information related to the conference that is to be started.

Next, if the conference start notification is received, the controller 200 specifies conference reservation information on the basis of the conference specification information included in the conference start notification. Also, on the basis of the specified conference reservation information, the controller 200 determines whether or not a conference-related file is acquirable (step S124).

If a conference-related file is acquirable, the file acquisition unit 220 acquires a file from the location indicated by the file storage destination of the conference reservation information specified by the conference specification information (step S124; Yes→step S126), and stores the file in the file storage area 268. At this time, the thumbnail data is stored to be identifiable for each conference ID and date, such as by generating a directory for each conference ID and date, and storing the thumbnail data in a corresponding directory. Also, the controller 200 transmits the file stored in the file storage area 268 to the display control device 10 that transmitted the conference start notification via the communication unit 240 (step S128).

1.3.3 Process Flow of Conference Management Application

Figure 13:
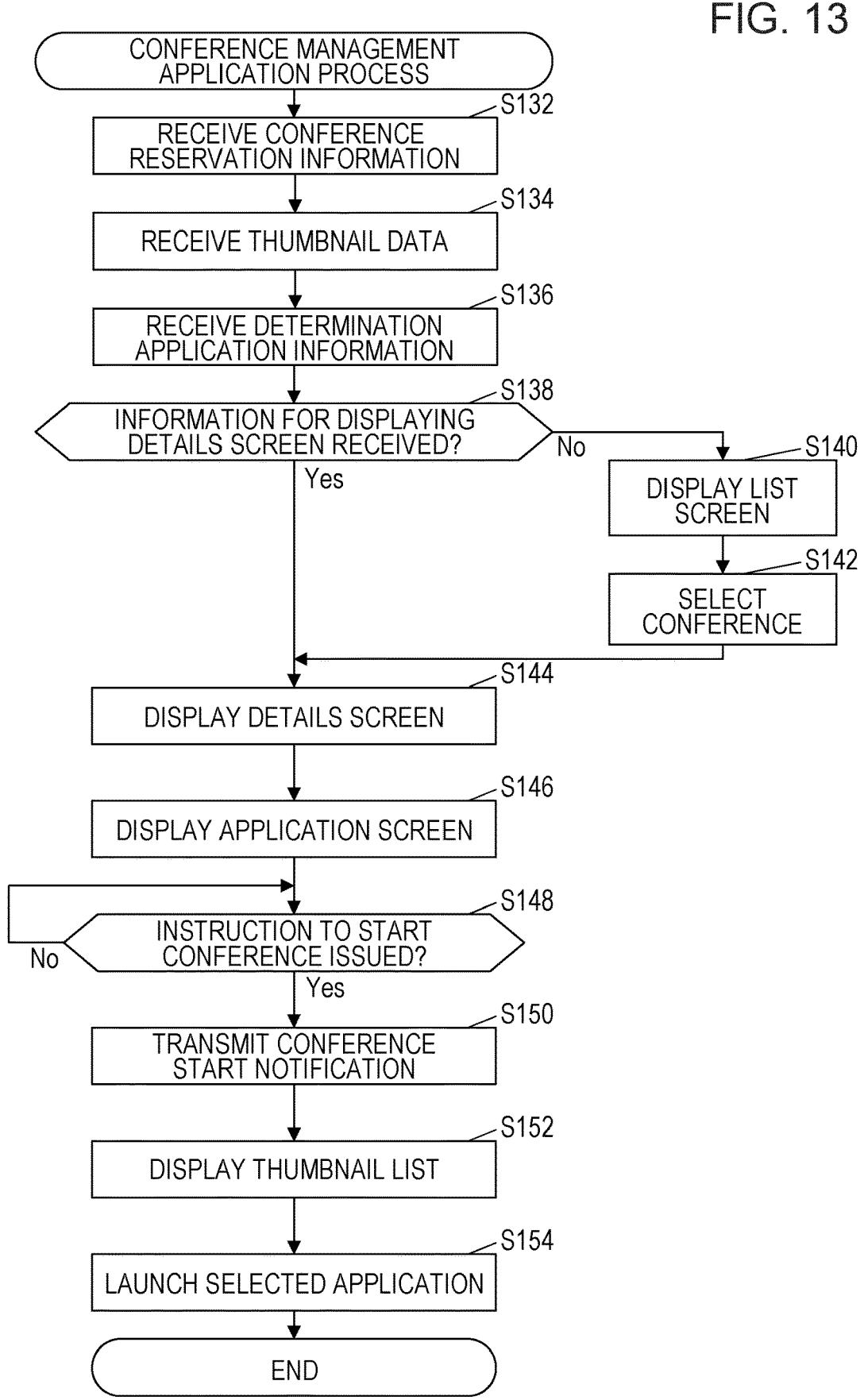
FIG. 13 is an operational flowchart for explaining a process of a conference management application according to the first embodiment.

Next, FIG. 13 will be referenced to describe the process flow of the conference management application. Note that the conference management application process is a process realized by the controller 100 reading out and executing the conference management application 152.

First, the controller 100 receives conference reservation information transmitted from the conference management server 20 (step S132). Also, the controller 100 receives thumbnail data transmitted from the conference management server 20 (step S134), and stores the thumbnail data in the thumbnail data storage area 160. In the present embodiment, the thumbnail data transmitted from the conference management server 20 is thumbnail data stored in the thumbnail data storage area 270. Consequently, the thumbnail data stored in the thumbnail data storage area 160 is also distinguishable for each conference ID and date.

Additionally, the controller 100 receives determined application information transmitted from the conference management server 20 (step S136).

Next, the controller 100 determines whether or not information indicating to display the details screen has been received from the conference management server 20 (step S138). In the case of receiving information indicating to display the details screen, for the reserved conference reservation information among the conference reservation information received in step S132, the controller 100 displays a details screen on the display device 15 via the output unit 110 (step S38; Yes→step S144).

Also, in the case of not receiving information indicating to display the details screen, or in other words, in the case in which the controller 100 receives information to display the list screen from the conference management server 20, the controller 100 displays the list screen on the display device 15 via the output unit 110. On the list screen, the conference reservation information received in step S132 is displayed in a list (step S138; Yes→step S140).

In the case in which the user selects a piece of conference reservation information on the list screen (step S142), the controller 100 displays a details screen based on the selected conference reservation information on the display device 15 via the output unit 110 (step S144).

Next, on the basis of the determined application information received in step S136, the controller 100 selects and displays on the details screen the application to launch when starting the conference (step S146). In the present embodiment, either of the file display application 154 and the handwriting/drawing application 156 is selectable as the application to launch when starting the conference. If the determined application information, that is, the name of the application, is "file display application", the controller 100 causes the icon corresponding to the file display application 154 to be displayed in an identifiable manner. Also, if the determined application information, that is, the name of the application, is "handwriting/drawing application", the controller 100 causes the icon corresponding to the handwriting/drawing application 156 to be displayed in an identifiable manner.

In the case of receiving an instruction to start the conference from the user, the controller 100 transmits a conference start notification to the conference management server 20 via the communication unit 140 (step S148; Yes→step S150).

Next, on the basis of the conference reservation information corresponding to the conference to be started, the controller 100 reads out thumbnail data stored in the thumbnail data storage area 160, and displays a thumbnail list on the display device 15 via the output unit 110 (step S152). In the thumbnail data storage area 160, thumbnail data is stored in a form such that the conference ID and date are identifiable. Consequently, on the basis of the conference ID and the scheduled start time in the conference reservation information corresponding to the conference to be started, thumbnail data corresponding to a file to use in the conference is extracted from the thumbnail data storage area 160. Also, the thumbnail list displays the extracted thumbnail data arranged vertically for each file together with the corresponding file name.

In the present embodiment, in the case in which a piece of thumbnail data displayed on the thumbnail list is selected, the file display application that is the first application is notified of information related to the file corresponding to the selected thumbnail data. The information related to the file is the file name and the like.

Note that in the case in which thumbnail data based on the conference reservation information corresponding to the conference to be started is not stored in the thumbnail data storage area 160, the controller 100 may also not display the thumbnail list by not performing the process in step S152.

Next, the controller 100 reads out the application selected as the application to launch when the conference is selected on the details screen as the selected application from the storage unit 150, and launches the application (step S154).

Note that in the case in which the application to launch is not installed in the display control device 10, the controller 100 may cause the display device 15 to display a warning or a display encouraging installation via the output unit 110.

1.3.4 Process Flow of File Display Application

Figure 14:
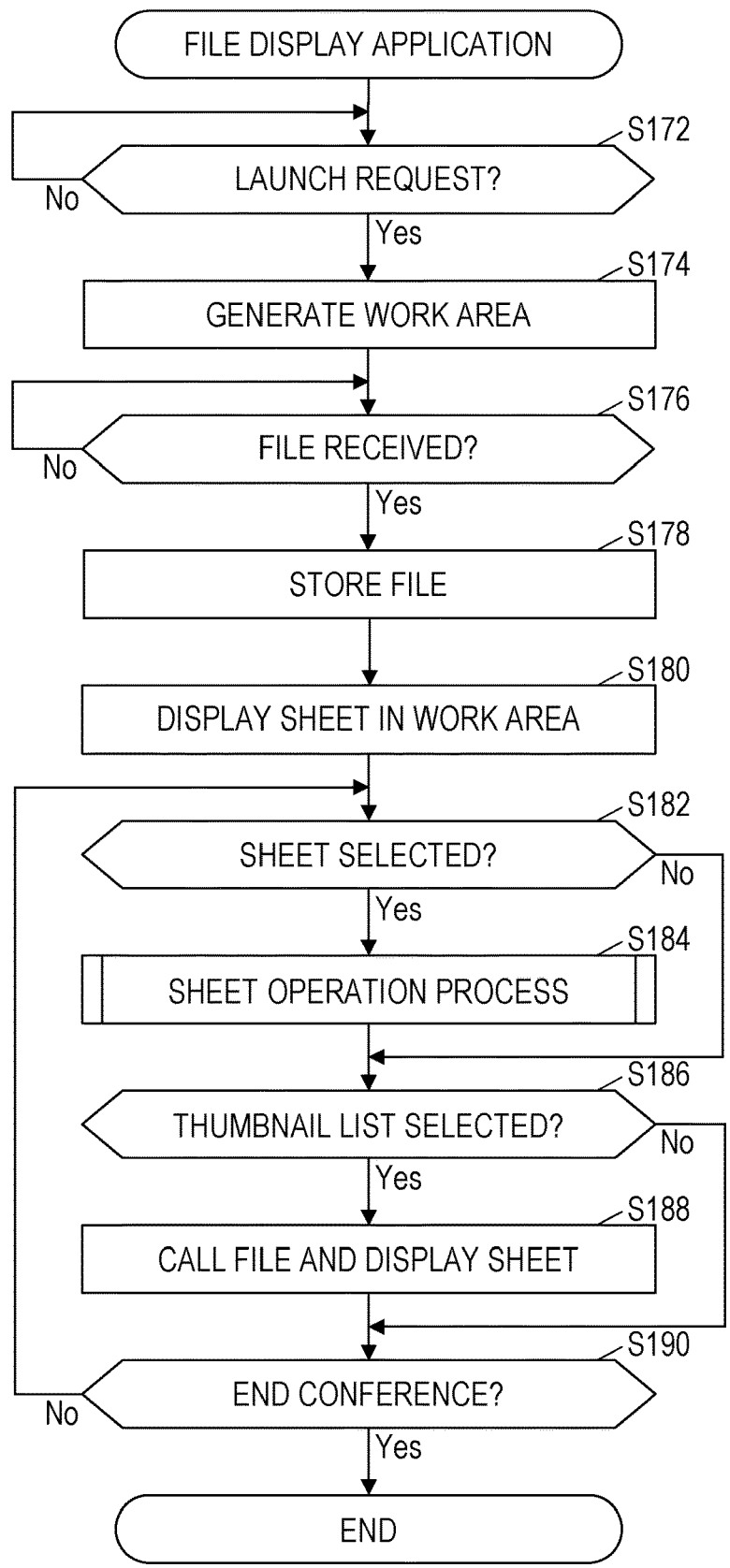
FIG. 14 is an operational flowchart for explaining a process of a file display application according to the first embodiment.

Next, FIG. 14 will be referenced to describe a process of the file display application that is the first application. The process of the file display application is a process realized by the controller 100 reading out and executing the file display application 154.

First, the file display application 154 determines whether or not there is a launch request (step S172). The launch request is made due to the file display application 154 being launched by being read out and executed by the controller 100 in step S154 of FIG. 13, for example.

Next, the file display application 154 generates a work area (step S174). The work area is an area displayed on the dip lay device 15, and is an area in which sheets corresponding to files may be displayed. Note that the files to display on the sheets may be limited to document files, such as word processor files, spreadsheet files, or presentation files, or to files stoning displayable content, such as video files and image files.

Also, a sheet is image data generated on the basis of a file, and is a preview image indicating the file. For example, if the file is a document file, a representative page may be displayed as the preview image. If the file is a video file, a capture image of a certain scene may be displayed as a still image, or a scene may be played back and displayed as a video on the sheet. Also, if the file is a document file that includes multiple pages, a sheet with turnable pages may be displayed.

Next, the file display application 154 stores a file received from the conference management server 20 via the communication unit 140 in the file storage area 158 (step S176; Yes→step S178). Also, the file display application 154 reads out the file stored in the file storage area 158, and displays a sheet in the work area (step S180).

In the case in which a sheet is selected, the file display application 154 performs a specific process on the sheet (step S182; Yes→step S184). The process performed on the sheet may be moving, enlarging, reducing, or rotating, and if the sheet has turnable pages, the process may be turning the page. Also, operations such as dividing and joining pages may also be performed on the sheet.

Next, the file display application 154 determines whether or not the thumbnail list displayed in step S152 of FIG. 13 has been selected (step S186). In the present embodiment, in the case in which a piece of thumbnail data is selected from the thumbnail list, the file name is reported as information related to the file corresponding to the selected thumbnail data. Consequently, the file display application 154 determines whether or not the thumbnail list has been selected according to whether or not a file name has been reported.

In the case in which a file name has been reported due to the thumbnail list being selected, the file display application 154 reads out the file corresponding to the reported file name from the file storage area 158, and display a sheet based on the file in the work area (step S186; Yes→step S188).

Next, the file display application 154 determines whether or not to end the conference (step S190). The case of ending the conference conceivably refers to the case in which an operation to end the conference is performed by the user, the case in which the current time reaches the scheduled end time of the conference, or the like. In the case of ending the conference, the file d splay application 154 ends (step S190; Yes). Also, in the case of not ending the conference, the process returns step S182 (step S190; No→step S182).

1.4 Example Operations

1.4.1 Screen Transitions

Next, transitions of screens that the display control device 10 causes the display device 15 to display will be described with reference to FIG. 15.

Figure 15:
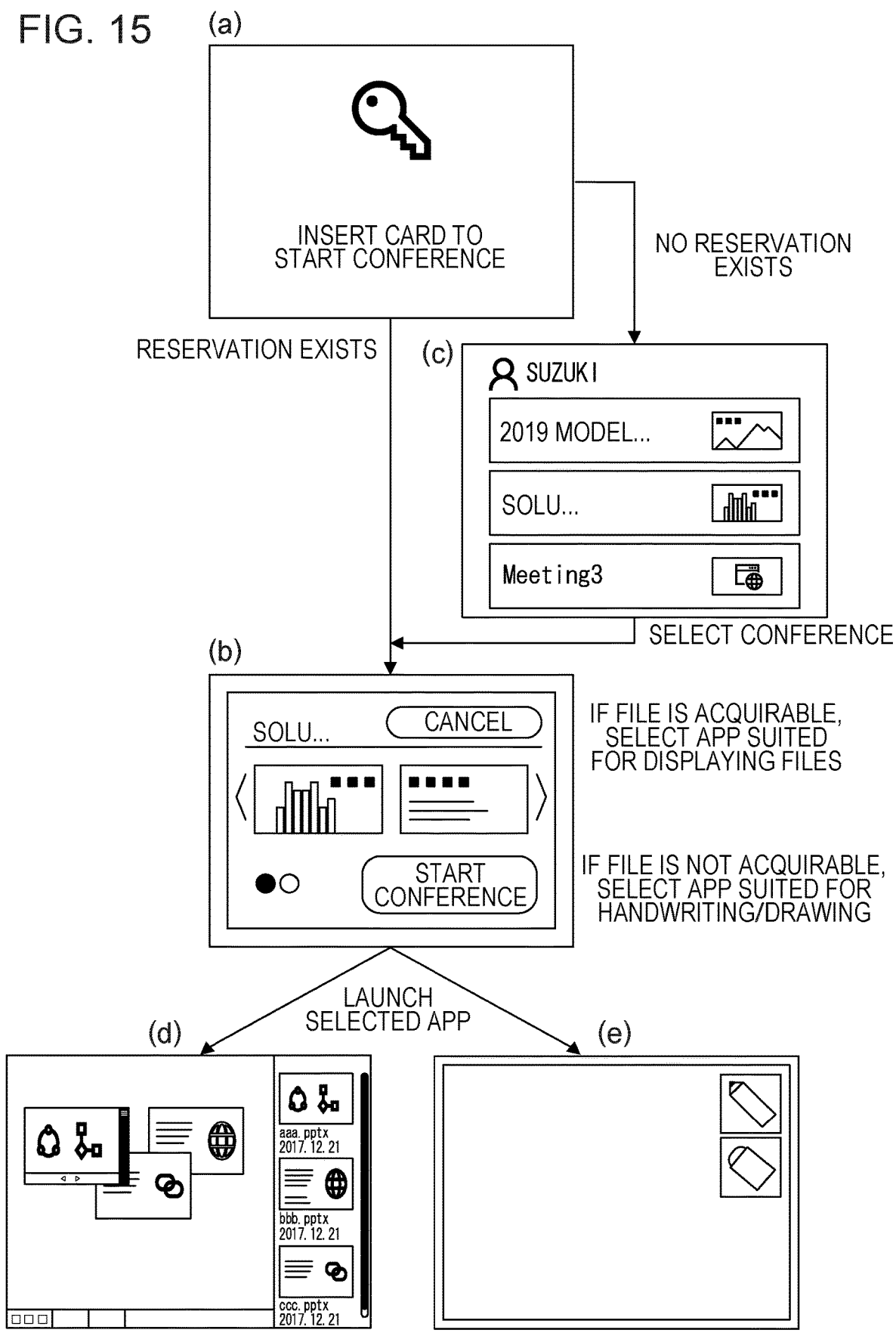
FIG. 15 is a diagram for explaining example operations according to the first embodiment.

In FIG. 15, (a) is a screen for authenticating a user. On this screen, the authentication method may be displayed, and a text box for inputting authentication information may be displayed. Also, in the case in which authentication is unnecessary, a Start button or the like may be displayed.

In FIG. 15, (b) is the details screen. The details screen is displayed in the case in which a details screen display request is received from the conference management server 20, and one piece of conference reservation information is selected from the list of conference reservation information illustrated in (c) of FIG. 15.

From the details screen, if an instruction to start the conference is issued by selecting the Start Conference button, an application is launched according to the application to launch when starting the conference selected on the details display. At this point, in the case in which an application suited to displaying files has been selected, the file display application 154 is launched ((d) in FIG. 15). In the case in which an application suited to handwriting has been selected, the handwriting/drawing application 156 is launched ((e) in FIG. 15).

1.4.2 Details Screen

Figure 16:
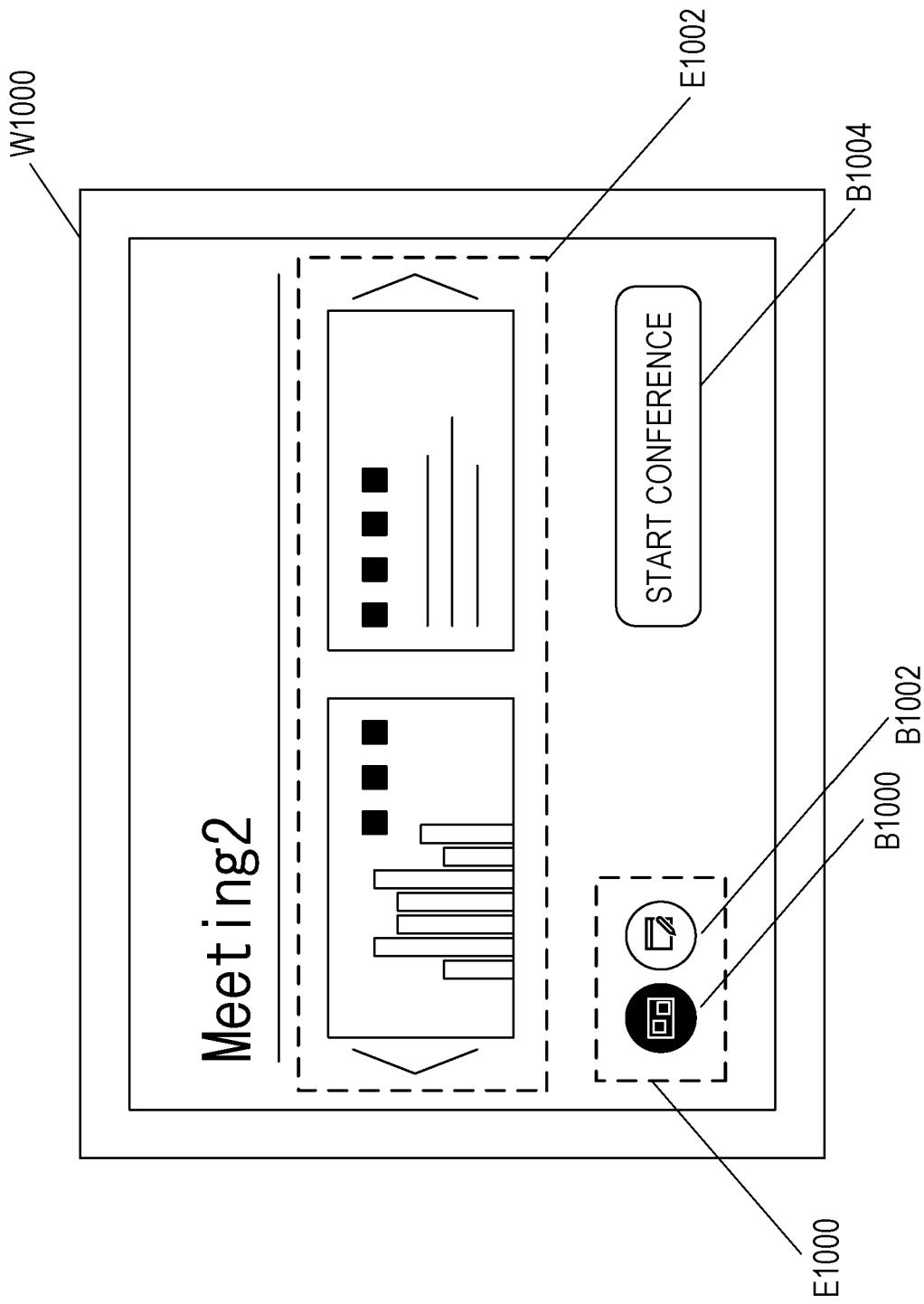
FIG. 16 is a diagram for explaining example operations according to the first embodiment.

Next, the details screen will be described with reference to FIG. 16. The display screen W1000 is one example of the details screen. The display screen W1000 includes an area E1000 for selecting the application to launch when starting the conference, an area E1002 that displays thumbnail data, and a button B1004 for issuing an instruction to start the conference. Also, The area E1000 for selecting the application includes an icon B1000 indicating the file display application 154 and an icon B1002 indicating the handwriting/drawing application 156. Note that FIG. 16 illustrates that B1000 is selected.

The icon B1000 and the icon B1002 may be selected by an operation such as a click or a tap performed by the user. Note that, as illustrated in FIG. 16, by selecting the button B1004 with the icon B1000 indicating the file display application 154 in the selected state, the file display application 154 is launched.

1.4.3 File Display Application

Figure 17:
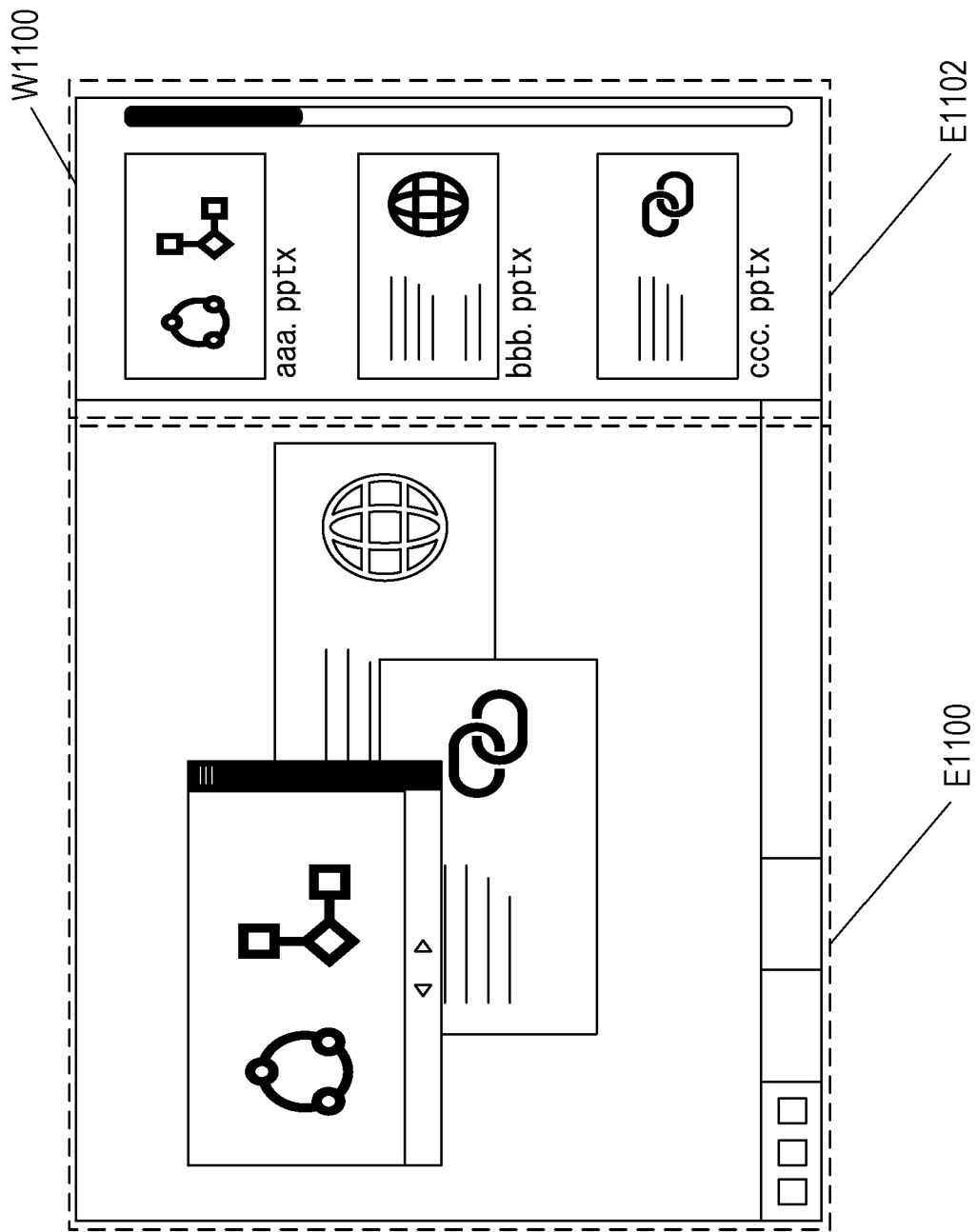
FIG. 17 is a diagram for explaining example operations according to the first embodiment.

The file display application 154 will be described with reference to the drawings. FIG. 17 is a display when launching the file display application 154. On a screen display W1100, a work area region E1100 and a region E1102 displaying a thumbnail list are displayed. Also, sheets are displayed in the work area region E1100. The user is able to perform operations such as moving, page-turning, and hiding with respect to the sheets displayed in the work area region E1100.

Figure 18B:
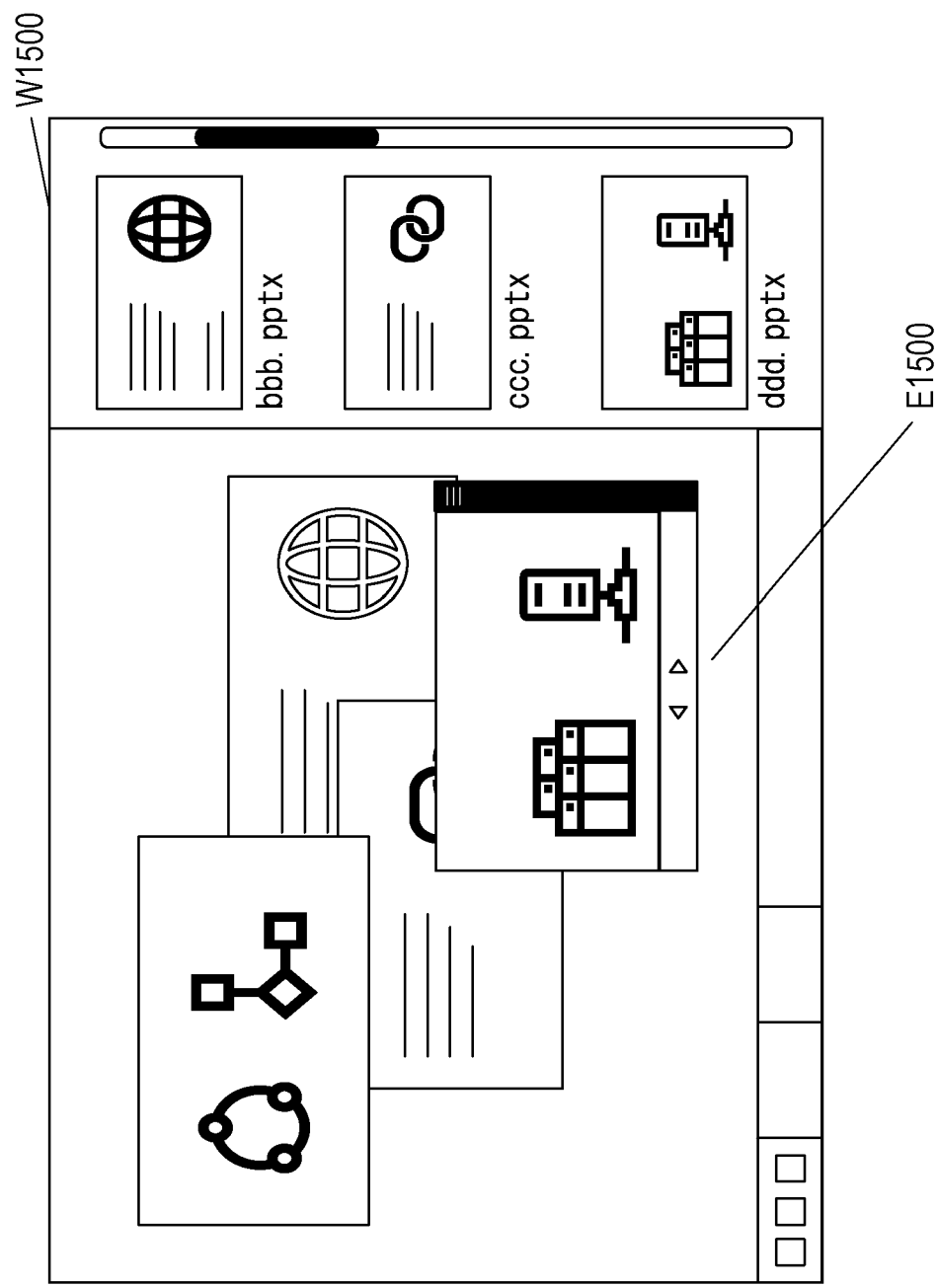

Also, the behavior in the case of selecting a piece of thumbnail data from the thumbnail list displayed in the region E1102 will be described with reference to FIGS. 18A and 18B. In FIG. 18A, the user is able to select a piece of thumbnail data displayed inside a screen display W1400. Hypothetically, in the case in which B1400 is selected, the file corresponding to the selected thumbnail data is displayed as a sheet, as illustrated by the region E1500 in FIG. 18B. With this arrangement, the user is able to cause a desired file to be displayed.

1.4.4 Handwriting/Drawing Application

Next, the case of launching the handwriting/drawing application 156 will be described with reference to FIGS. 19A and 19B. The display screen W1600 illustrated in FIG. 19A is one example of the details screen. Herein, the drawing illustrates that, as a result of the icon B1002 being selected, the handwriting/drawing application 156 is launched when starting the conference. By selecting the button B1004 in this state, the handwriting/drawing application 156 is launched.

In the case in which an instruction to start the conference is issued, a region E1700 In which handwriting is possible is displayed on a display screen W1700 as illustrated in FIG. 19B. The user, by performing touch operations and the like on the region E1700, is able to draw lines and erase drawn lines.

According to the embodiment described above, with a simple operation of the user selecting a conference from a conference list, it is possible to stand by in a state in which an application to launch when starting the conference has been selected. Also, it becomes possible to start the conference from this state.

Also, in the file display application 154, files received from the conference management server 20 are displayed as sheets. Consequently, it is not necessary for the user to perform a procedure such as checking the file storage destination where files to use in the conference are stored, making it possible to start the conference smoothly.

Note that in the description of the present embodiment, the file display application 154 is described as being launched as the first application while the handwriting/drawing application 156 is described as being launched as the second application, but obviously an application other than the above may also be launched. For example, the second application may also be an application suited to brainstorming (for example, an application that creates a mind map).

Also, in the present embodiment, the application to launch when starting the conference is determined by the conference management server 20, but may also be determined by the display control device 10. For example, if one or more pieces of thumbnail data corresponding to the conference reservation information displayed on the details screen are being stored in the thumbnail data storage area 160, it is determined that files to be used in the conference are acquirable. In this case, the file display application 154 is selected as the application to launch when starting the conference. In the case in which thumbnail data is not being stored, it is determined that files to be used in the conference are not acquirable, and the handwriting/drawing application 156 is selected as the application to launch when starting the conference.

Also, there may be more than two types of applications from which to select the application to launch when starting the conference. For example, the conference reservation information includes information whether or not to perform teleconferencing, and in the case of performing teleconferencing, a voice chat application may be selected. In this case, conditions and selected applications are added to the application information of the conference management server 20 as appropriate. Also, the storage unit 150 of the display control device 10 stores the application to launch when starting the conference.

2. Second Embodiment

Next, a second embodiment will be described. The second embodiment is an embodiment in which, in the first embodiment, the sheets to display in the work area are decided on the basis of the importance of the files.

Figure 20:
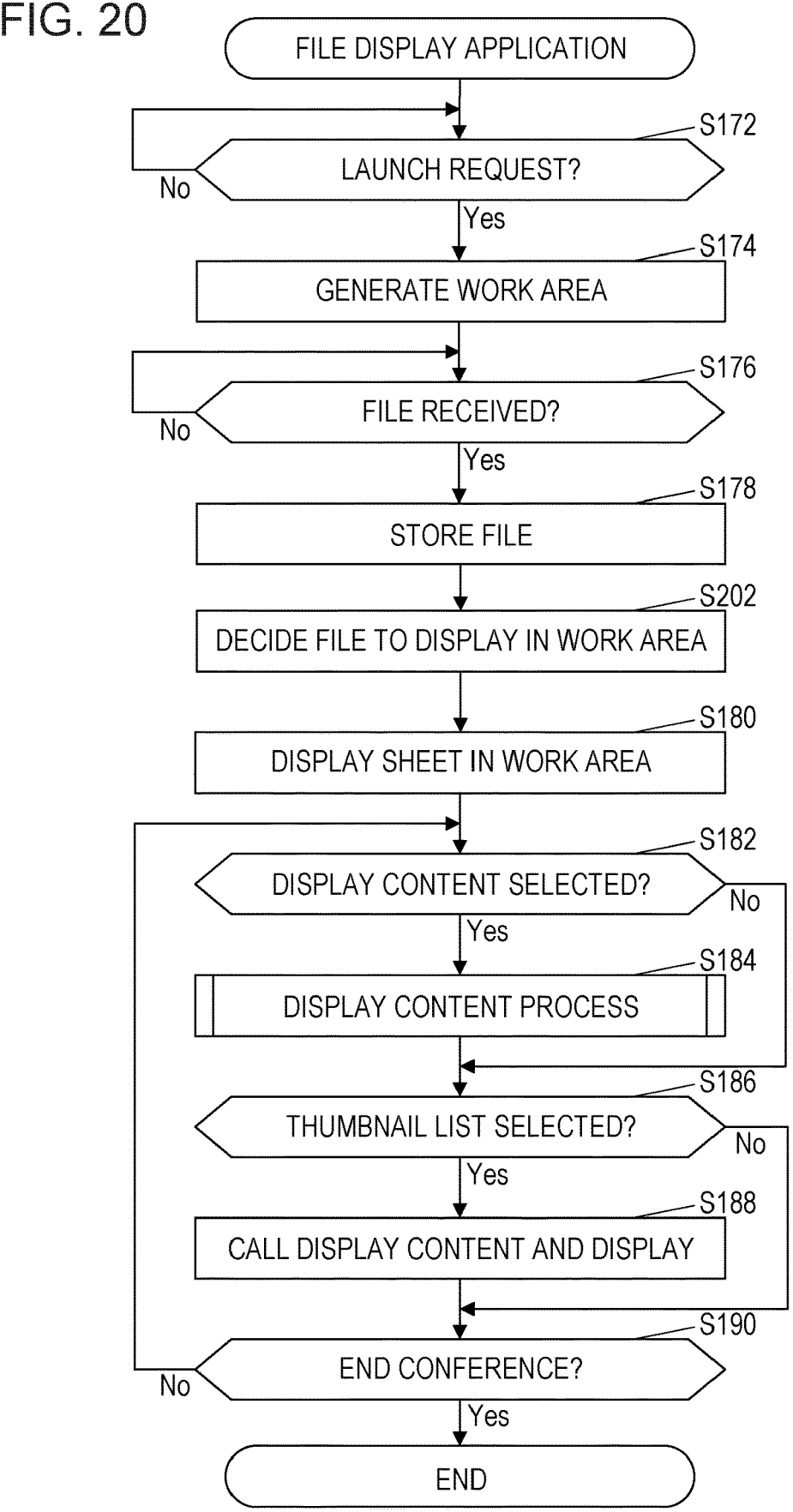
FIG. 20 is an operational flowchart for explaining a process of a file display application according to a second embodiment.

In the second embodiment, FIG. 14 of the first embodiment is replaced by FIG. 20. Note that processes which are the same as the first embodiment are denoted with the same sighs, and the description thereof is omitted.

In the second embodiment, in step S178, the file display application 154 decides the sheets to display in the work area on the basis of the files received from the conference management server 20, according to the importance of the files (step S202). The importance of a file is decided for each file, on the basis of attributes of the file. The importance may be represented by a flag indicating whether or not the file is important or the like, or may be represented by a value computed on the basis of an predetermined indicator.

Specific examples of attributes to use in determining the importance of files are listed below.

(1) Modified Time

This is based on the assumption that a file with a more recent modified time is being corrected frequently, and thus is important. Specifically, files whose modified time is included in a predetermined period from the current time (for example, going back 7 days) are considered to be important. Alternatively, a file is determined to be of higher importance the closer the modified time is to the current time. Note that the last accessed time may also be used instead of the modified time.

(2) Last Modified By

This is based on the assumption that a file modified by a user having rights with respect to the conference is important. For example, the conference reservation information is made to include the user who reserved the conference, and files modified by the user who reserved the conference are considered to be important. Additionally, files modified by a user with a high official position may also be considered to be important.

(3) File Size

This is based on the assumption that a file with a large file size is important. For example, when files are sorted by file size, the files with larger file sizes are determined to be of higher importance.

(4) File Type

Files thought to have a large amount of information, such as presentation files and video files, are determined to ne important, while text files and image files are determined to be of low importance.

Note that obviously the importance may also be decided on the basis of attributes other than the above attributes. Also, the importance may be decided by combining multiple attributes. For example, (1) and (2) described above may be combined such that among the files modified by the user having rights with respect to the conference, the files with a more recent modified time are determined to be more important.

Additionally, the file determined to be important or the top-ranking files (such as the top 5 files in order of importance, for example) among the file of high importance are decided as the files to display in the work area. Next, the file display application 154 reads out the files to display in the work area from the file storage area 158, and displays sheets in the work area (step S180).

According to the embodiment described above, even the case in which many files exist in the file storage destination may be accommodated flexibly. In other words, only the files considered to be important may be displayed, without displaying all of the files stored in the file storage destination in the work area.

3. Third Embodiment

Next, a third embodiment will be described. The third embodiment is an embodiment that, in the case of resuming a conference that has been held already, makes it possible to resume from the state when the previous conference ended.

Figure 3:
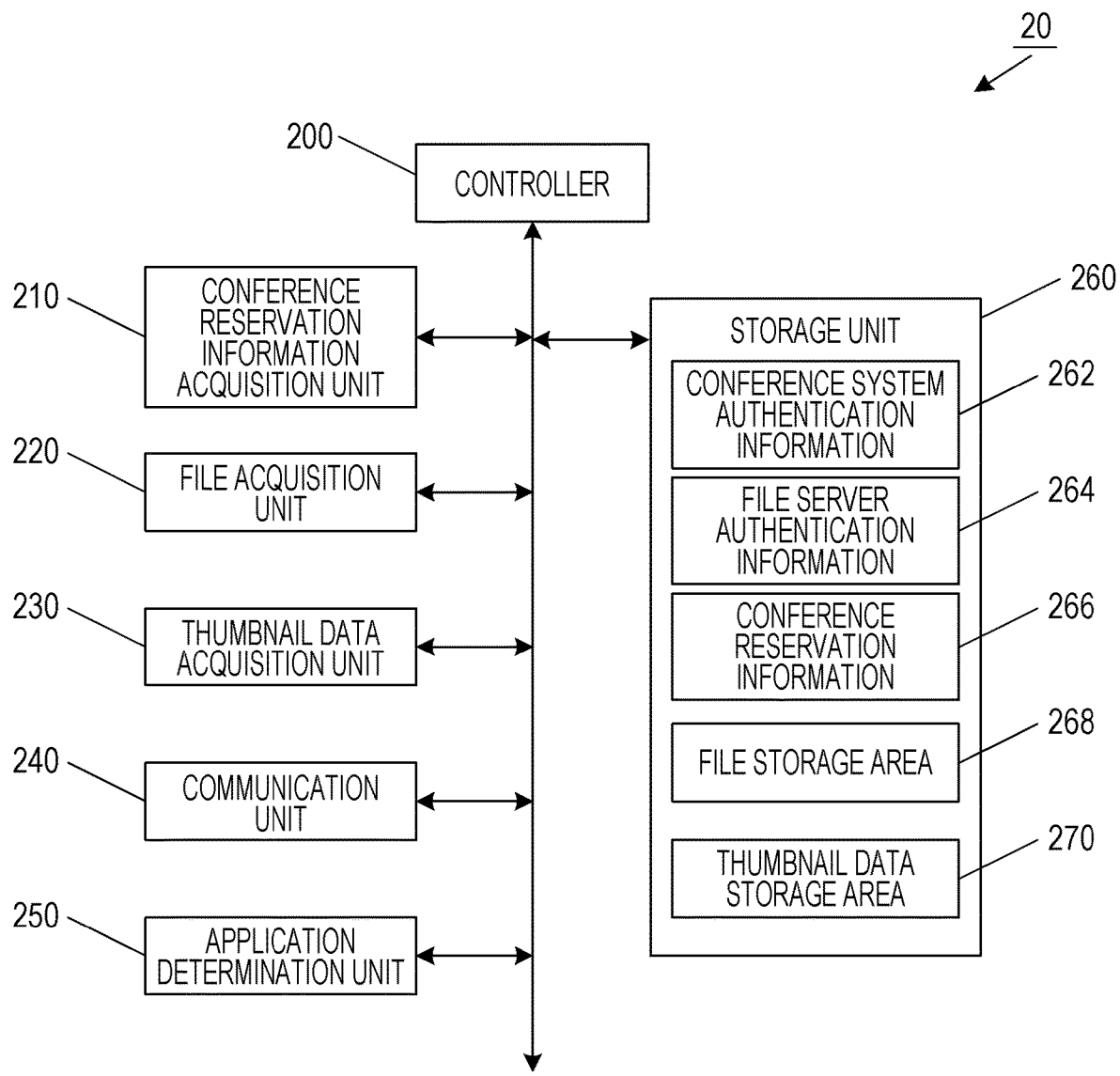
FIG. 3 is a diagram for explaining a functional configuration of a conference management server according to the first embodiment.

In the third embodiment, FIG. 3 of the first embodiment is replaced by FIG. 21. Note that functional units which are the same as the first embodiment are denoted with the same signs, and the description thereof is omitted.

Herein, in the conference management server 22 according to the present embodiment, in the storage unit 260, the conference system authentication information 262, the file server authentication information 264, the conference reservation information 266, and previous setting information 272 are stored, while in addition, the file storage area 268 and the thumbnail data storage area 270 are secured storage areas. Herein, in the previous setting information 272, the state of the display control device 10 in the previous conference is stored.

As an example, as illustrated in FIG. 22, the previous setting information 272 stores the conference name (for example, "KaigiA") for specifying the conference, the selected application (for example, "file display application") for specifying the application launched when starting the conference in the previous conference, and a display file (for example, "FileServerA/KaigiA/171013/aaa.doc") for specifying a file that had been displayed in the previous conference.

In the present embodiment, when the conference management server 20 transmits the conference reservation information to the display control device 10, information about whether or not corresponding previous setting information exists is included for each conference. Also, when the controller 100 of the display control device 10 displays the details screen via the output unit 110, or when an operation to start the conference is performed, if the previous setting information 272 corresponding to the conference exists, the user is queried about whether or not to resume from the state when the previous conference ended, on the basis of the setting.

In the case of resuming the conference on the basis of the previous setting information 272, the display control device 10 launches the application specified by the selected application of the previous setting information 272. Also, the conference management server 20 acquires the file specified by the display file of the previous setting information 272 from the file server 40, and transmits the file to the display control device 10 via the communication unit. In the case of not resuming the conference on the basis of the previous setting information, the conference is started according to the process of the first embodiment.

In the present embodiment, when ending a conference (step S190; Yes), the controller 100 of the display control device 10 transmits information including the conference ID, the application launched when starting the conference, and the file being displayed when ending the conference to the conference management server 20. On the basis of the information received from the display control device 10, the controller 200 of the conference management server 20 stores the previous setting information 272 when ending the conference.

Note that in the present embodiment, the previous setting information 272 is stored for each conference ID, but the conference ID and the date may be combined to store the previous setting information 272 for each conference on each date. With this arrangement, even if there are conferences with the same name, it is possible to resume a conference for each date on which the conference was held.

Also, the information to store in the previous setting information 272 is not limited to the information described above. For example, the positions and sizes of sheets, and the display pages may be stored. Also, for the selected application, the application that was active when the conference was ended may be stored, or a user operation that launches the application may be store to launch the application in the next conference.

According to the present embodiment, in the case in which a user holds a conference on an ongoing basis, it becomes possible to resume the conference from the state when the previous conference was ended, and an improvement in convenience may be anticipated.

4. Fourth Embodiment

Next, a fourth embodiment will be described. The fourth embodiment is an embodiment that makes it possible to start a new conference, without selecting a conference from the conference reservation information.

Figure 2:
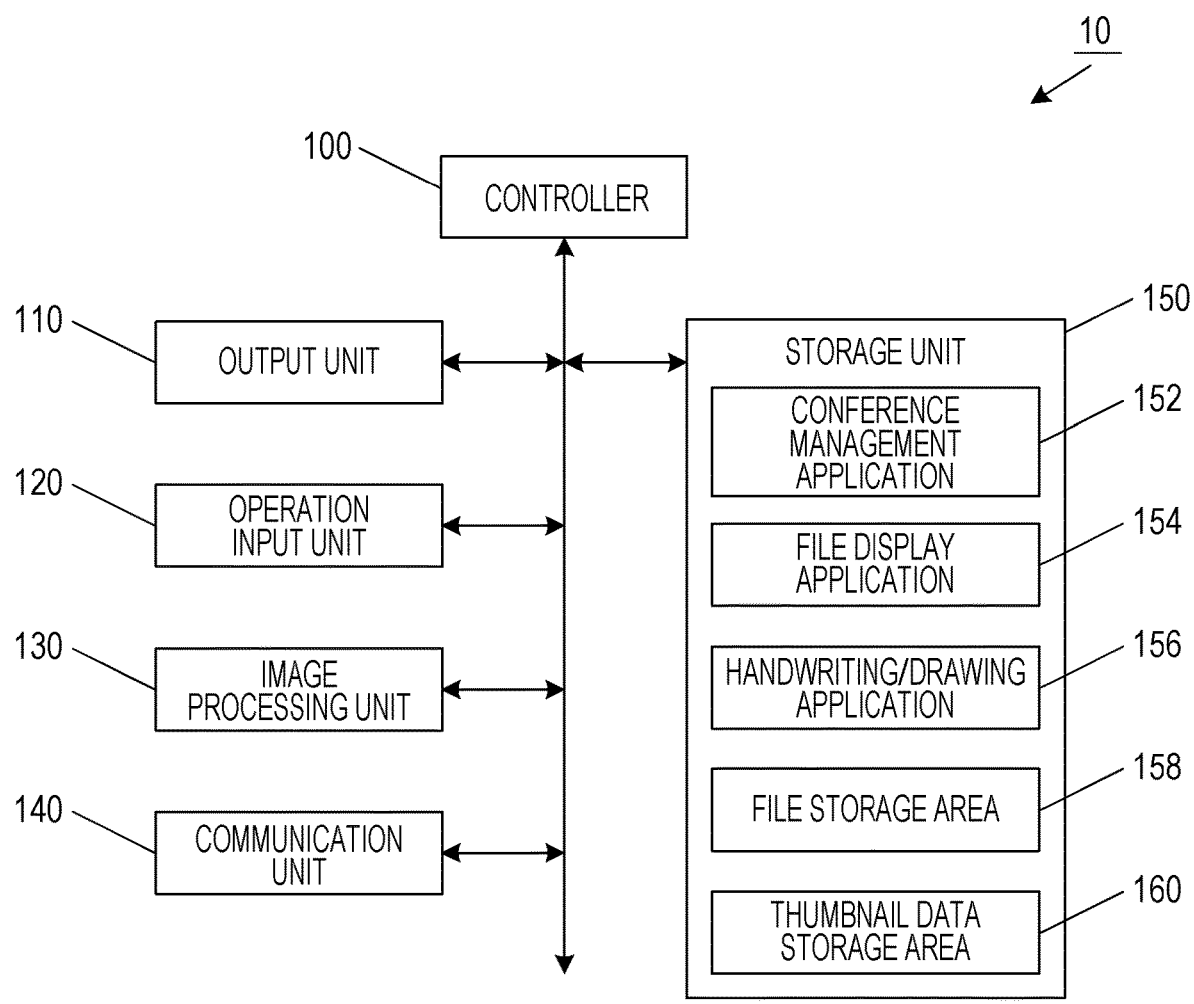
FIG. 2 is a diagram for explaining a functional configuration of a display control device according to the first embodiment.
Figures 23, 24:
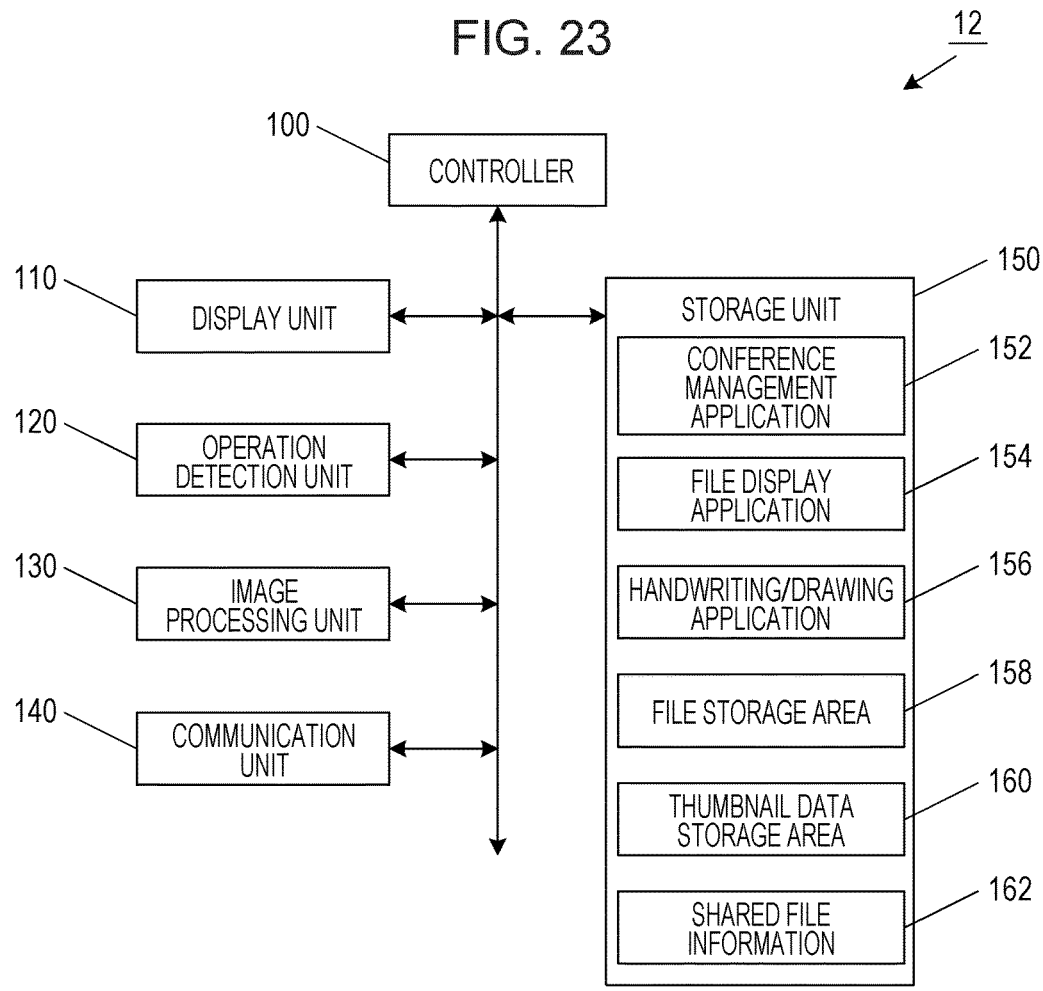
FIG. 23 is a diagram for explaining a functional configuration of a display control device according to a fourth embodiment.
FIG. 24 is a diagram illustrating one example of a data structure of shared file information according to the fourth embodiment.

In the fourth embodiment, FIG. 2 of the first embodiment is replaced by FIG. 23. Note that functional units which are the same as the first embodiment are denoted with the same signs, and the description thereof is omitted.

Herein, in the display control device 12 according to the present embodiment, in the storage unit 150, the conference management application 152, the file display application 154, and the handwriting/drawing application 156 are stored, the file storage area 158 and the thumbnail data storage area 160 are secured, and in addition, shared file information 162 is stored. Herein, in the shared file Information 162, information indicating the storage destination of a file being shared (shred file) is stored. The shared file is displayed in the file display application 154.

As one example, as illustrated in FIG. 24, the shared file information 162 stores a user name "for example, "SUZUKI") for specifying a user and a shared file storage destination (for example, "FileServerA/Users/SUZUKI") wherein files shared by the user are stored. In this way, in the present embodiment, an example in which the shared file storage destination is stored on a per-user basis will be described.

The shared file information 162 may be stored in the display control device 10, or shared file information may be delivered from the conference management server 20.

A specific example of a case of holding a new conference is given below.

(1) On the list screen, a button for receiving an instruction to start a new conference is displayed.

(2) When the button is selected, the details screen is displayed (on the details screen, "New Conference" may be displayed as the conference name to indicate to the user that a new conference will be started).

(3) in the case in which a file is acquirable from the shared file storage destination corresponding to the logged-in user, the file display application 154 is selected as the application to launch when starting the conference.

(4) In the case in which a file is not acquirable from the shared file storage destination corresponding to the logged-in user, the handwriting/drawing application 156 is selected as the application to launch when starting the conference.

(5) If an instruction to start the conference is given, the application to launch when starting the conference is launched.

(6) In the case of launching the file display application 154, files are acquired from the shared file storage destination, and the file display application 154 is made to display the acquired files.

According to the process described above, the application to launch when starting the conference is selected according to whether or not a file is acquirable from the shared file storage destination. Also, in the case in which a file is acquirable from the shared file storage destination, the acquired file may be displayed.

In this way, according to the present embodiment, even in the case of initiating a new conference, it becomes possible to cause an application suited to the conference to be selected.

5. Modifications

The present disclosure is not limited to the embodiments described above, and various modifications are possible. In other words, embodiments that may be obtained by combining technical means appropriately modified within a scope that does not depart from the gist of the present disclosure are to be included within the technical scope of the present disclosure.

Additionally, obviously it is possible to combine and execute the embodiments described above in a non-contradictory manner other than the ways described above. For example, the second embodiment and the third embodiment may be combined. With this arrangement, in the case of resuming a conference, the user is able to select whether or not to resume from the previous state, and even in the case of not resuming from the previous state, it becomes possible to cause the file display application 154 to display important files as sheets automatically.

Also, a program that runs on each device in the embodiments is a program that controls a CPU or the like (a program that causes a computer to function), such that the functions of the embodiments described above are realized. Additionally, information handled by these devices is held temporarily in a transient storage device (for example, RAM) when being processed, and after that, stored in any of various types of storage devices such as read-only memory (ROM) or a hard disk drive (HDD) and read out, corrected/written, and the like by the CPU as appropriate.

Herein, a recording medium that stores the program may be any of semiconductor media (such as ROM or a non-volatile memory card, for example), optical recording media/magneto-optical recording media (such as a Digital Versatile Disc (DVD), a magneto-optical (MO) disc, a Mini-Disc (MD), a Compact Disc (CD), or BD, for example), and magnetic media (such as magnetic tape of a flexible disk, for example), and the like. Also, rather than the functions of the embodiments described above being realized by executing a loaded program, in some cases the functions of the present disclosure may be realized by joint processing with an operating system, another application program, or the like.

Also, in the case of distribution into the market, the program may be distributed such as by being stored on a portable recording medium, or by being transferred to a server computer connected via a network such as the Internet. In this case, a storage device of the server computer obviously is included in the present invention.

The present disclosure contains subject matter related to that disclosed in Japanese Priority Patent Application JP 2017-252122 filed in the Japan Patent Office on Dec. 27, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device connectible to a file server and a display control device capable of executing a selected application, the information processing device comprising:
   a communication unit that communicates with a file server and the display control device;

a storage unit that storages an application selection information associating conditions with applications to select in case of a matching condition; and a controller that extracts corresponding conference reservation information on a basis of login information received by the display control device via the communication unit, acquires reference information including the conditions indicating the presence or absence of a file associating with a conference from the file server on a basis of the extracted conference reservation information, determines the applications to be used in the conference on a basis of the reference information and the application selection information, and transmits information indicating the determined applications to the display control device.

2. The information processing device according to claim 1, wherein the controller connects to the file server on a basis of specification information that includes information specifying the file server and determines the applications to be used in the conference on a basis of the reference information that includes the conditions indicating the presence or absence of the file.

3. The information processing device according to claim 2, wherein the controller acquires the specification information from a specification information management device that manages the specification information.

4. The information processing device according to claim 1, wherein the controller selects a first application capable of displaying the file in a display device controlled by the display control device in case of the conditions indicating the presence of the file, and selects a second application capable of drawing lines based on handwriting input into the display device controlled by the display control device in case of the conditions indicating the absence of the file.

5. The information processing device according to claim 1, wherein the controller acquires thumbnail data related to the file associating with the conference from the file server in case where the reference information includes the conditions indicating the presence of the file and transmits the acquired thumbnail data to the display control device.

6. An information processing system comprising:

an information processing device connectible to a file server, the information processing device including (a) a communication unit that communicates with a file server- and a display control device, (b) a storage unit that storages an application selection information associating conditions with applications to select in the case of a matching condition, and (c) a first controller that extracts corresponding conference reservation information on a basis of login information received by the display control device via the communication unit acquires reference information including the conditions indicating the presence or absence of a file associating with a conference from the file server on a basis of the extracted conference reservation information, determines the applications to be used in the conference on a basis of the reference information and the application selection information, and transmits information indicating the determined applications to the display control device: and the display control device that controls a display device, wherein a second controller that causes information indicating the applications determined by the first controller to be identifiably displayed in a display device.

7. An information processing method in an information processing device connectible to a file server and a display control device capable of executing a selected application, the information processing method comprising:

communicating with the file server and the display control device;

storing an application selection information associating conditions with applications to select in case of a matching condition;

extracting corresponding conference reservation information on a basis of login information received by the display control device;

acquiring reference information including the conditions indicating the presence or absence of a file associating with a conference from the file server on a basis of the extracted conference reservation information;

determining the applications to be used in the conference on a basis of the reference information and the application selection information; and transmitting information indicating the determined applications to the display control device.

* * * * *